(12) United States Patent
Chung et al.

(10) Patent No.: US 11,833,642 B2
(45) Date of Patent: Dec. 5, 2023

(54) POWER TOOL WITH ELECTRICALLY CONTROLLED COMMUTATING ASSEMBLY

(71) Applicant: TECHWAY INDUSTRIAL CO., LTD., Taichung (TW)

(72) Inventors: Fu-Hsiang Chung, Taichung (TW); Hong Fang Chen, Taichung (TW); Wei-Ting Chen, Taichung (TW); Shih-Wei Hung, Taichung (TW); Kuo Chou Li, Taichung (TW)

(73) Assignee: TECHWAY INDUSTRIAL CO., LTD., Taichung (TW)

( * ) Notice: Subject to any disclaimer, the term of this patent is extended or adjusted under 35 U.S.C. 154(b) by 680 days.

(21) Appl. No.: 17/035,247

(22) Filed: Sep. 28, 2020

(65) Prior Publication Data

US 2021/0094156 A1    Apr. 1, 2021

(30) Foreign Application Priority Data

Oct. 1, 2019    (TW) .................................. 108135506
Mar. 3, 2020    (TW) .................................. 109106945

(51) Int. Cl.
| B25B 21/00 | (2006.01) |
| H01F 7/02 | (2006.01) |
| H02K 7/14 | (2006.01) |
| H02K 7/116 | (2006.01) |
| H01F 7/06 | (2006.01) |

(52) U.S. Cl.
CPC ............. B25B 21/004 (2013.01); H01F 7/02 (2013.01); H01F 7/06 (2013.01); H02K 7/116 (2013.01); H02K 7/145 (2013.01)

(58) Field of Classification Search
CPC ..... B25B 21/00; B25B 21/002; B25B 21/004; B25B 13/46; B25B 13/463; B25B 13/481; B25B 23/00; B25B 23/12; B25F 5/00; B25F 5/02; H01F 7/02; H01F 7/0273; H01F 7/06; H02K 1/06; H02K 7/116; H02K 7/145; H02K 33/16; H02P 29/00
See application file for complete search history.

(56) References Cited

U.S. PATENT DOCUMENTS

| 4,589,307 A * | 5/1986 | Parker .................. B25B 13/463 81/62 |
| 2014/0102260 A1* | 4/2014 | Pusateri .................. F16H 31/00 173/1 |

* cited by examiner

*Primary Examiner* — Robert J Scruggs
(74) *Attorney, Agent, or Firm* — GUICE PATENTS PLLC

(57) ABSTRACT

The invention relates to a power tool with an electrically controlled commutating assembly comprising: an electrically controlled commutating assembly and a control unit; the electrically controlled commutating assembly has an electromagnetic unit; the electromagnetic unit is capable of performing a change in displacement due to electromagnetic action; the control unit has a control member, the control member is capable of changing a working direction of a power tool, and displacement of the electromagnetic unit is capable of actuating the control member of the control unit to make the power tool switch the working direction.

27 Claims, 19 Drawing Sheets

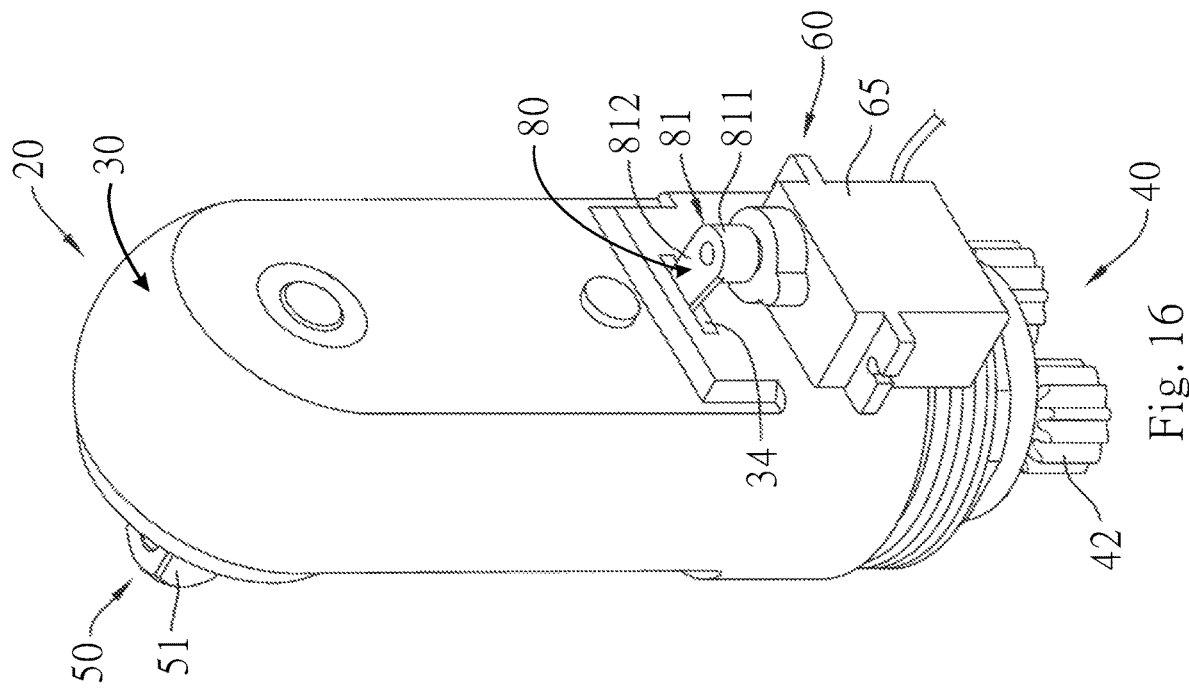
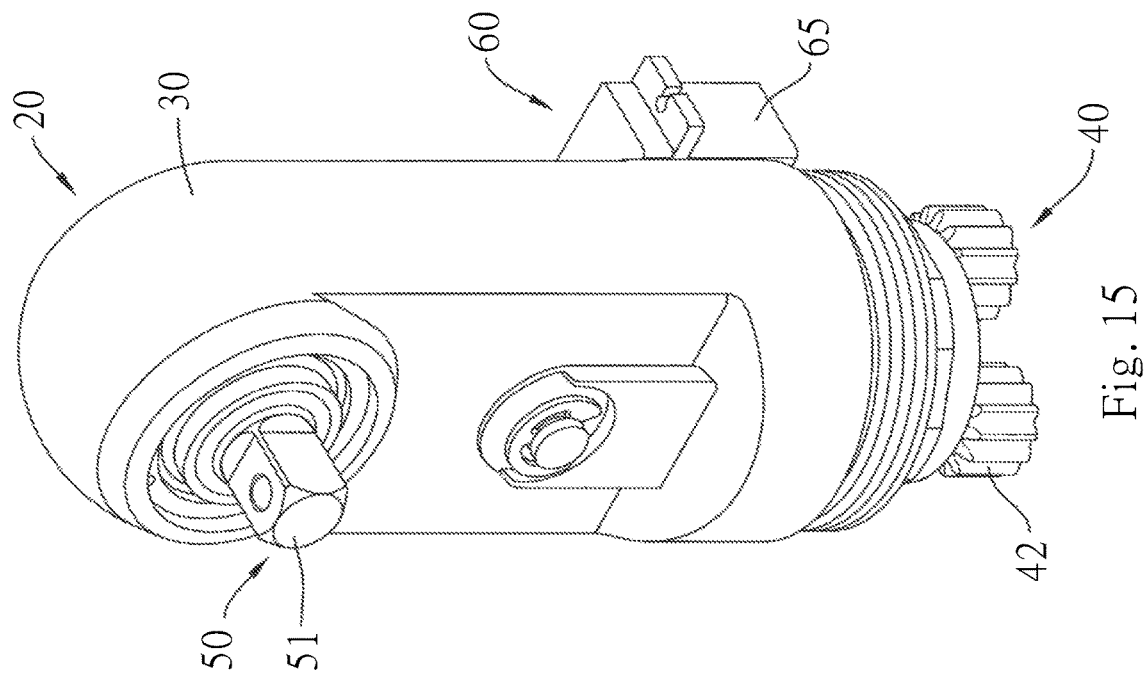

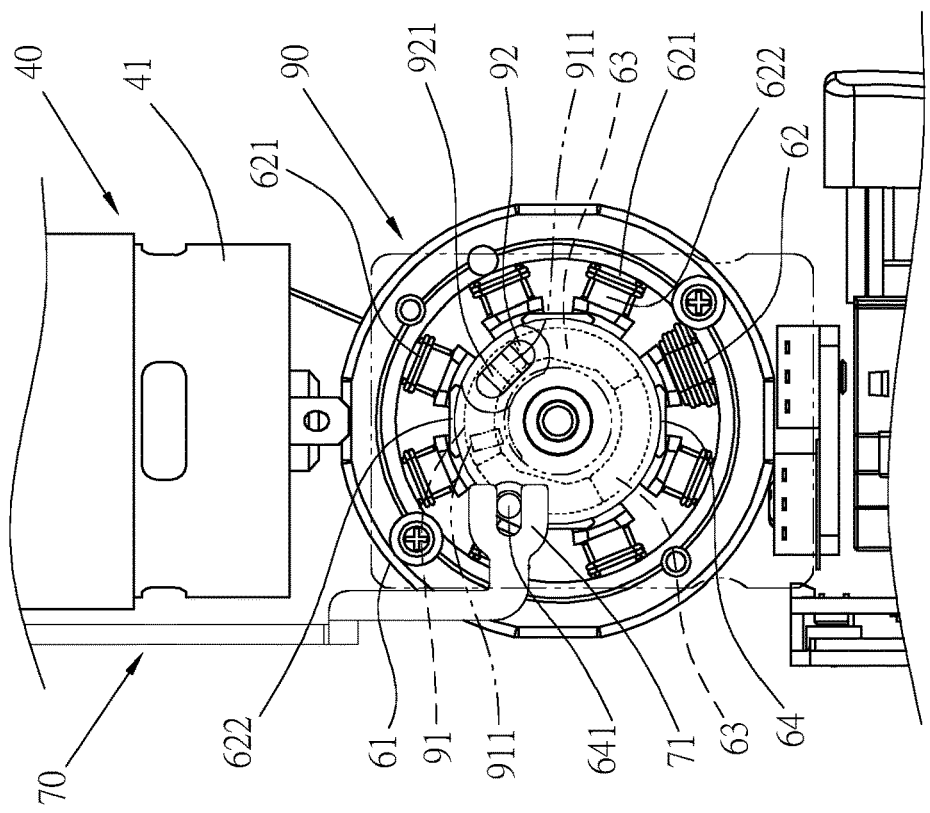
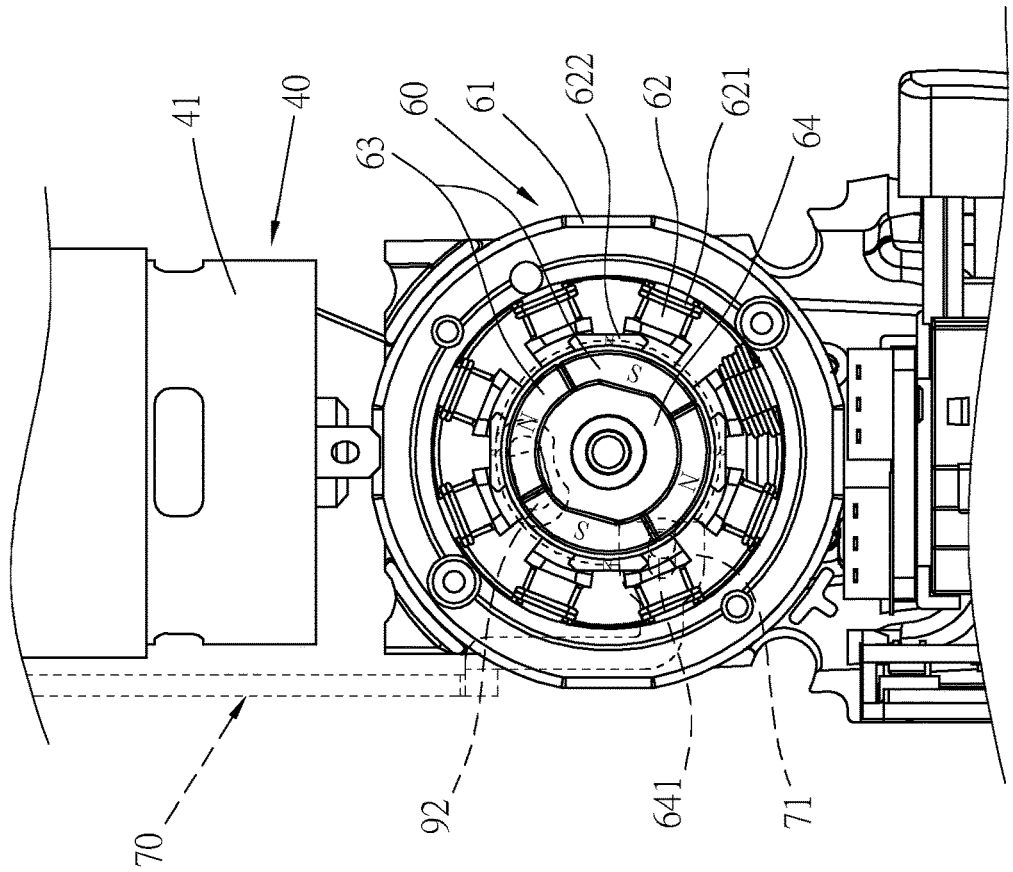
Fig. 24
Fig. 23

POWER TOOL WITH ELECTRICALLY CONTROLLED COMMUTATING ASSEMBLY

BACKGROUND OF THE INVENTION

Field of Invention

The invention relates to power tools, and more particularly to a power tool with an electrically controlled commutating assembly capable of producing electric commutating effect through changes in magnetic field.

Related Art

Ratchet wrench is a commonly used hand tool. In order to be able to apply force to operate at a narrow angle, a ratchet structure is used inside the ratchet wrench. As shown in FIG. 1, a conventional commutating ratchet wrench is mainly used to change the direction of applying force to operate the ratchet wrench by changing the direction of rotation of the ratchet. A ratchet structure 10 of the commutating ratchet wrench includes a ratchet 11, a detent gear 12, and a control member 13, the ratchet 11 is provided with detent teeth around a circumference of outer surface, the detent gear 12 can be correspondingly meshed with the outer surface of the ratchet 11, and through different directions of meshing, the ratchet 11 can be rotated in different directions to rotate a workpiece. The control member 13 elastically abuts against the detent gear 12 and can drive the detent gear 12 to change direction, and commutating action is performed through the control member 13. In addition, please refer to FIG. 2 for another driving method, the detent gear 12 is disposed on an outer side of the ratchet 11, the control member 13 is correspondingly disposed inside the ratchet 11, and actuating direction of the ratchet 11 is adjusted by switching a direction of the control member 13.

For the conventional ratchet structure, whether it is a manual ratchet wrench or an electric ratchet wrench, requires an operator to switch a direction of the control member 13 by hand in order to be able to change a rotating direction of the ratchet 11.

However, during the switching process of the control member 13, the user needs to use a hand to switch the control member 13 to perform the commutating action. When performing the commutating action, the tool needs to be taken out from the operating position first, if the work area is narrow or difficult to reach inside, it takes a considerable amount of time to take out the tool for commutating and place the tool back to the operating position again, which causes inconvenience in operation. Furthermore, because the control member 13 needs to be switched by hand, part of the structure of the control member 13 will be exposed, which is prone to intrusion of foreign matter or dust after long-term use, resulting in abrasion of the internal structure.

SUMMARY OF THE INVENTION

A main object of the invention is to provide an electric commutating assembly capable of producing effect of electrically switching rotating directions of a power tool by changing a magnetic field of an electromagnetic unit.

A secondary object of the invention is to use an external electrically controlled commutating assembly to drive commutating of a driving device, so that an internal structure of the driving device of a power tool does not need to be modified.

In order to achieve the above objects, the invention provides a power tool with an electrically controlled commutating assembly comprising:

a driving device having a control unit; the control unit having a control member, the control member being capable of changing a position to change a rotational actuating direction of the driving device; and an electrically controlled commutating assembly having an electromagnetic unit; the electromagnetic unit being capable of changing a magnetic field to change a position of the control member of the control unit, so that the driving device changing the rotational actuating direction.

The power tool with the electrically controlled commutating assembly provided by the invention is capable of changing an operating direction of the driving device by changing a position of the control unit through changes in electromagnetic field of the electromagnetic unit of the electrically controlled commutating assembly. the electrically controlled commutating assembly drives the control unit from outside, and an internal structure of the driving device does not need to be modified to enhance applicability.

BRIEF DESCRIPTION OF THE DRAWINGS

In order to enable the examiner to further understand the objects, features, and achieved efficacies of the invention, seven preferred embodiments are listed below for detailed explanation in conjunction with the drawings, wherein:

FIG. 15 is a perspective view of a fourth preferred embodiment of the invention viewed from a first viewing angle;

FIG. 16 is a perspective view of the fourth preferred embodiment of the invention viewed from a second viewing angle;

FIG. 23 is a schematic diagram of a first action of the electrically controlled commutating assembly of the sixth preferred embodiment of the invention;

FIG. 24 is a schematic diagram of a second action of the electrically controlled commutating assembly of the sixth preferred embodiment of the invention;

DETAILED DESCRIPTION OF THE INVENTION

Figure 1:
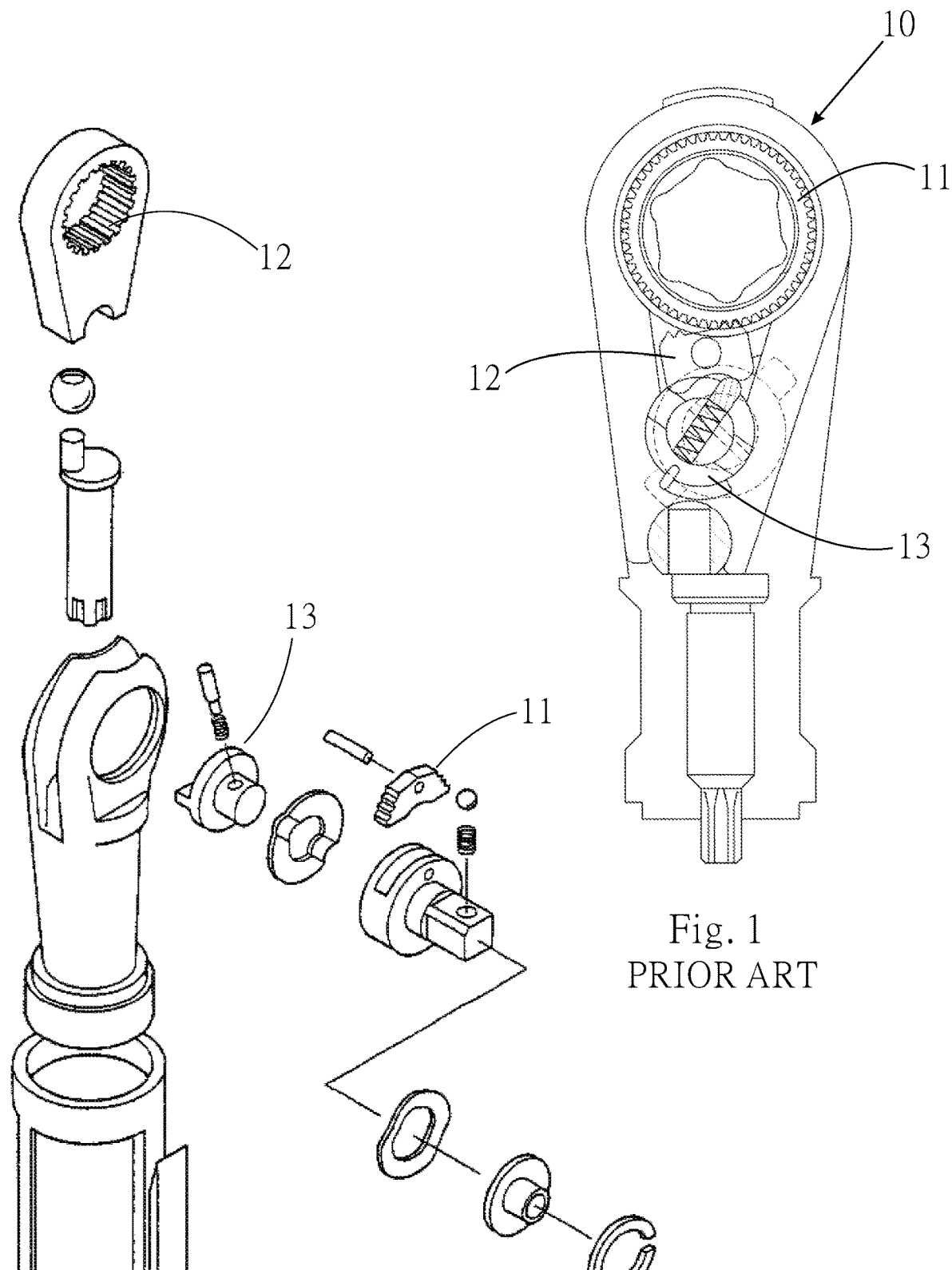
FIG. 1 is a perspective view of a conventional power tool.
Figure 2:
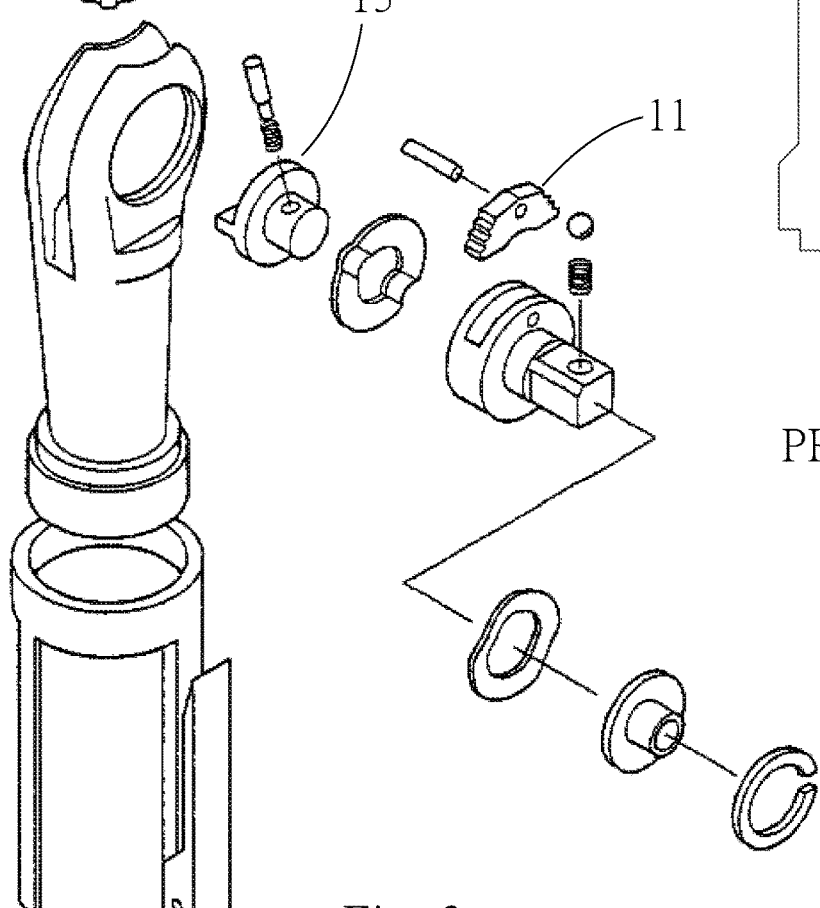
FIG. 2 is a perspective exploded view of another conventional power tool.
Figure 3:
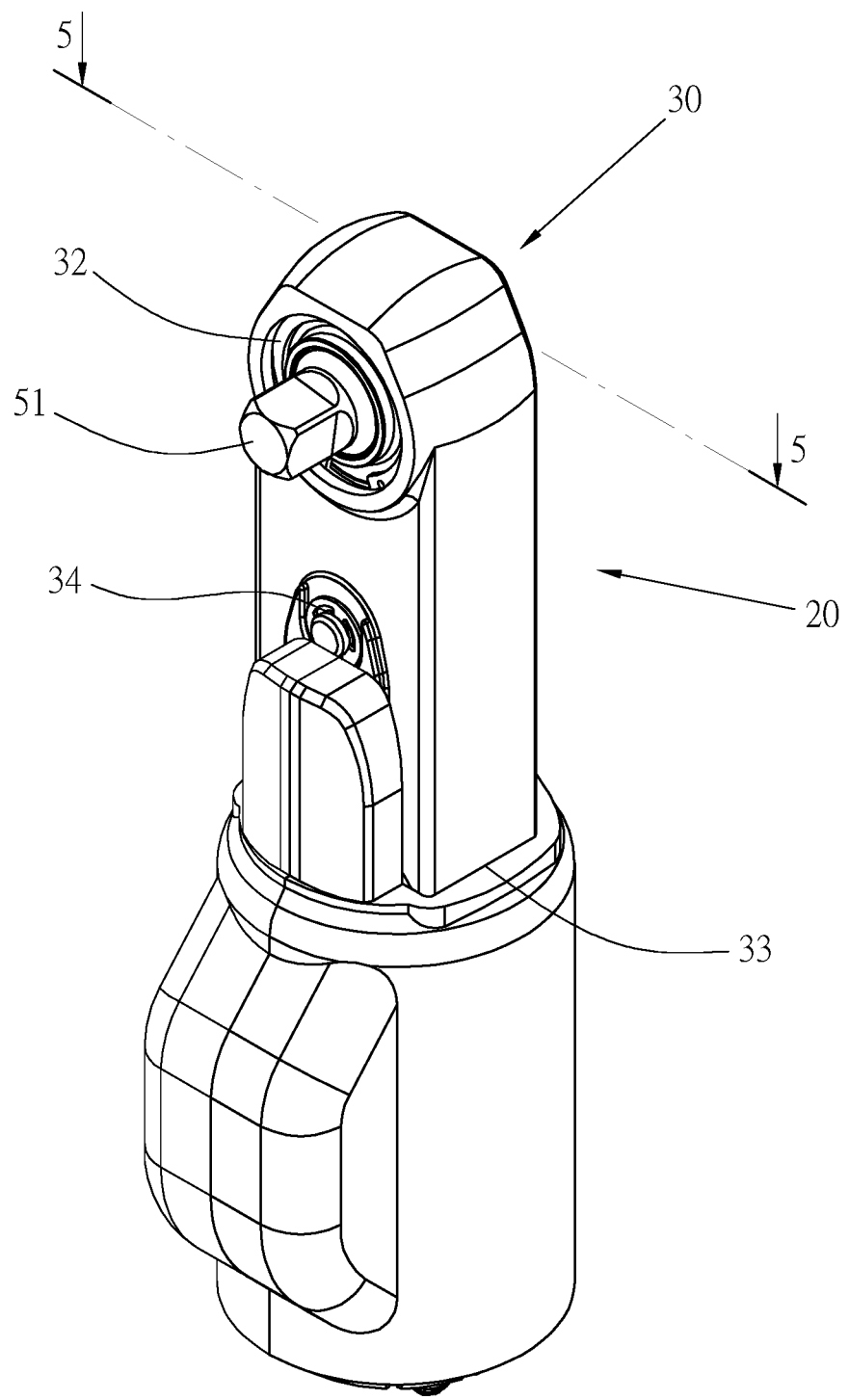
FIG. 3 is a perspective view of a power tool according to a preferred embodiment of the invention.
Figure 4:
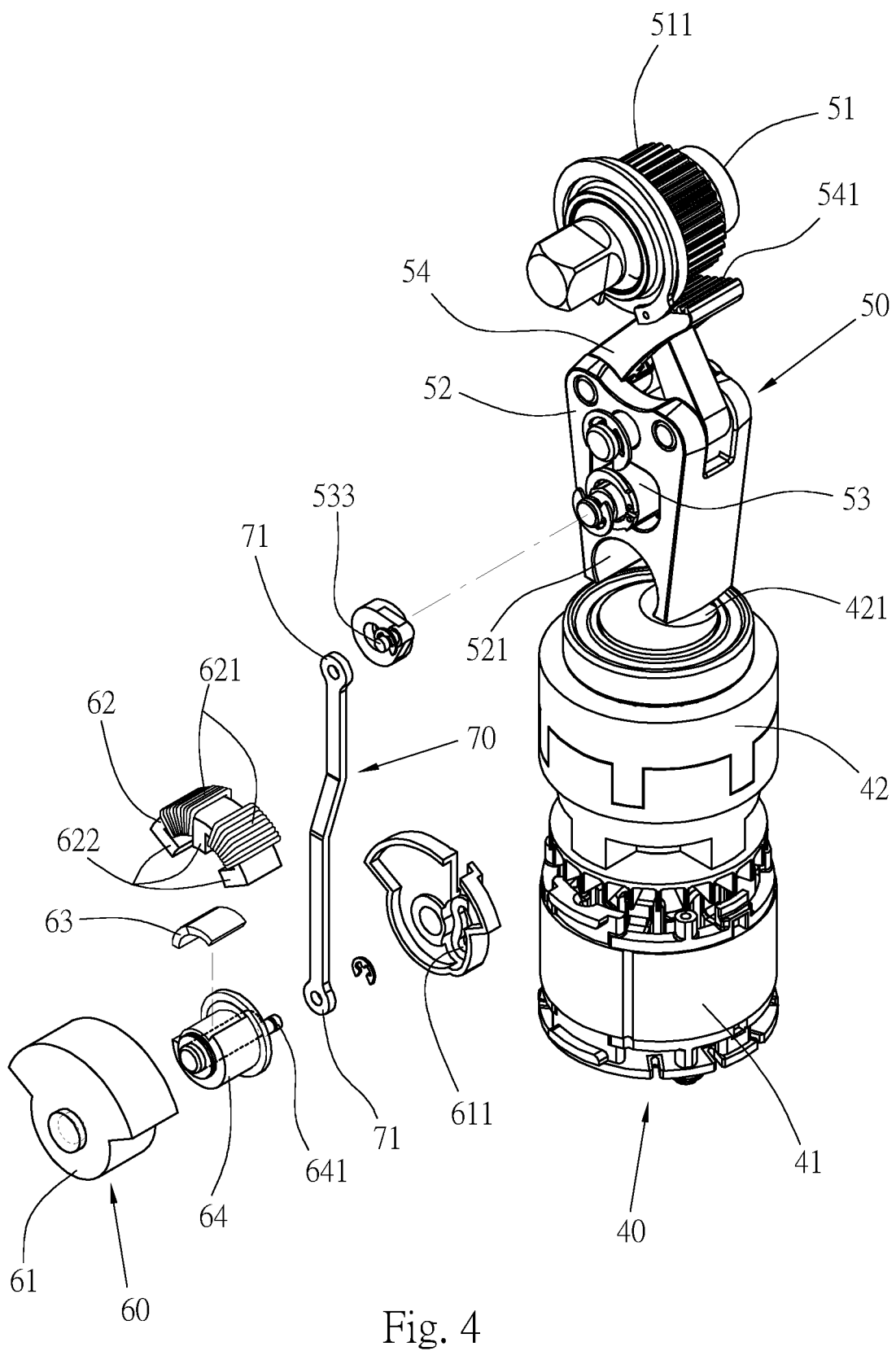
FIG. 4 is a perspective exploded view of internal components of the power tool of FIG. 3.
Figure 5:
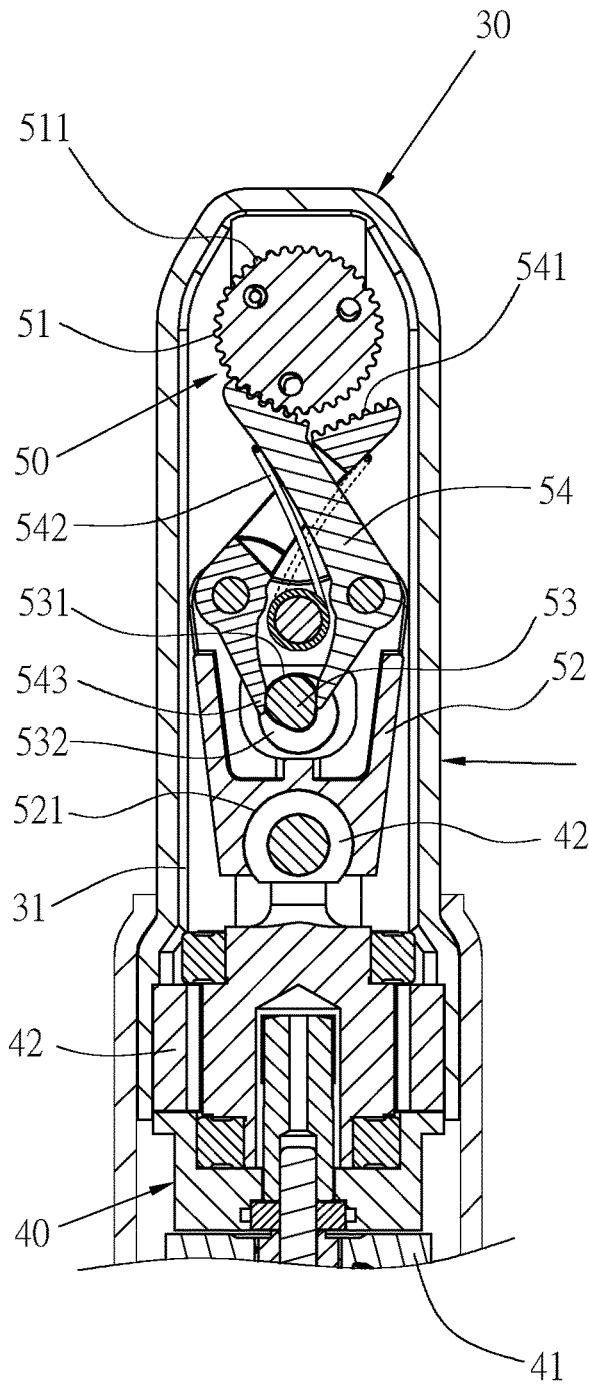
FIG. 5 is a cross-sectional view of the power tool taken along line 5-5 in FIG. 3.
Figure 6:
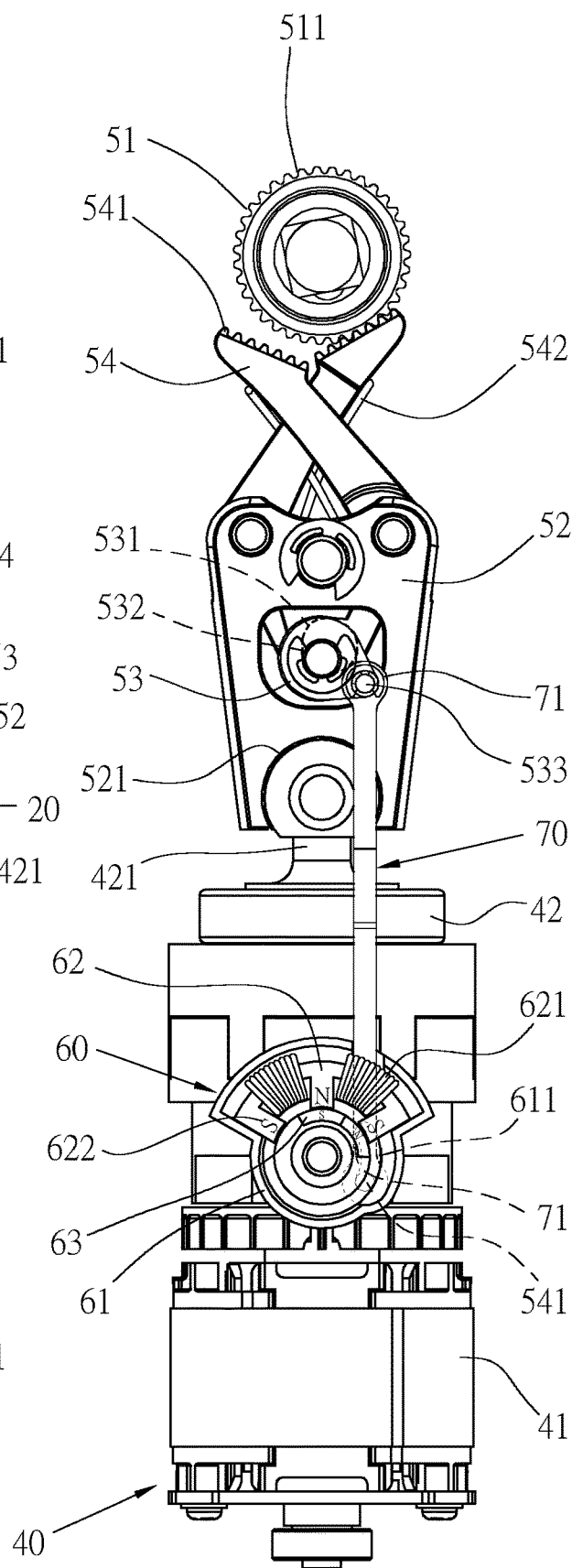
FIG. 6 is a schematic diagram of action in a first direction of an electrically controlled commutating assembly of the invention.

Please refer to FIGS. 3, 4 and 5, which are a power tool 20 provided by a preferred embodiment of the invention comprising a housing 30, a power source 40, a driving device 50, an electrically controlled commutating assembly 60, and a linkage member 70.

The housing 30 includes an accommodating space 31, a through hole 32, an opening 33, and a perforation 34. The accommodating space 31 of the housing 30 is hollow, and the through hole 32, the opening 33 and the perforation 34 penetrate the housing 30. The through hole 32 is circular and adjacent to a top of the housing 30, the opening 33 is circular and located at a bottom of the housing 30, and the perforation 34 is between the through hole 32 and the opening 33, wherein a penetrating direction of the through hole 32 is perpendicular to a penetrating direction of the opening 33, and a penetrating direction of the perforation 34 is parallel to a penetrating direction of the through hole 32.

Please refer to FIG. 4 for the power source 40, which is disposed into the accommodating space 31 from the opening 33, and includes a drive motor 41 and a power gear set 42. The drive motor 41 is capable of driving the power gear set 42 to rotate, the power gear set 42 is a reduction gear set capable of providing a function of reduces in rotational speed, and a front end of the power gear set 42 is provided with an eccentric shaft 421.

Please refer to FIGS. 4 and 5 for the driving device 50, which is disposed into the accommodating space 31 from the opening 33, a working head 51 is pivotally disposed at one end of the driving device 50 on the housing 30, and penetrating outside of the through hole 32, and a circumference of the working head 51 is surroundingly provided with a ratchet 511. The driving device 50 also comprises a control unit including a swing member 52, a control member 53 and two driving members. One end of the swing member 52 is pivotally disposed on the housing 30, another end thereof is recessed with a receiving groove 521 at an end side of the opening 33, and the eccentric shaft 421 is accommodated in the receiving groove 521. When the eccentric shaft 421 rotates eccentrically, the swing member 52 is driven to swing. The control member 53 is pivotally disposed in the swing member 52, and is provided with a pushing portion 531 and two guiding portions 532. The two guiding portions 532 are provided on two sides of the pushing portion 531 respectively. The control member 53 penetrates outside of an outer side of the housing 30 from the perforation 34, and is eccentrically protruded with a connecting rod 533, a position of the connecting rod 533 is different as the control member 53 switches direction. The two driving members are disposed between the working head 51 and the swing member 52. In this embodiment, the two driving members are composed of two swing arms 54, which can also be and not limited to ring gears or detent gears or other components capable of connecting with the swing member 52 and meshing with the working head 51, so that the working head 51 can be driven by the driving members to rotate in a predetermined direction. The two driving members can be driven by the swing member 52, and the control member 53 is capable of controlling contact position of the two driving members and the working head 51, thereby a rotation direction of the working head 51 can be controlled. The two swing arms 54 are pivotally disposed on the swing member 52 near a center, and capable of swinging deflectively as the swing member 52 swings. One end of each of the two swing arms 54 is provided with a teeth portion 541 for meshing with the ratchet 511 of the working head 51, and another end of each of the two swing arms 54 is provided with an abutting part 543 abutting against the control member 53. Each of the two swing arms 54 is also provided with an elastic member 542 with two ends elastically disposed on the two swing arms 54 respectively, so that the two swing arms 54 can be pressed against the working head 51 by elastic force. The other ends of the two swing arms 54 and the control member 53 contact with each other. When the abut portion 531 of the control member 53 is connected to one of the swing arms 54, an end of the swing arm 54 connected with the working head 51 will be pushed away from the working head 51, and the other swing arm 54 will come into contact with the guiding portion 532 so that the swing arm 54 can contact with the working head 51. When the swing member 52 is actuated, the swing arm 54 in contact with the working head 51 will move the working head 51 to rotate in a same direction. The structures of the power source 40 and the driving device 50 mentioned above are structures of a conventional commutating power tool. Related or similar driving methods in this technical field can be applied to the invention, and the structures are not particularly limited.

Please refer to FIGS. 4 and 5 for the electrically controlled commutating assembly 60, which has an enclosure portion 61, an electromagnetic unit and a commutating member 64. The enclosure portion 61 is fixed at a position on the power tool 20 near the power source 40. In this embodiment, the enclosure portion 61 is disposed at a peripheral side, and kept a certain distance from the working head 51 of the driving device 50, so as to prevent the working head 51 increasing too much volume. Inside the enclosure portion 61 is provided with an arcuate positioning groove 611. The enclosure portion 61 can also be directly disposed at a position inside the housing 30 without limiting the structure of the enclosure portion 61. The electromagnetic unit includes a fixed magnetic member 62 and a movable magnetic member 63, and the fixed magnetic member 62 is composed of an electromagnet with two adjacent coils 621 and three magnetic poles 622. Magnetic fields of the magnetic poles 622 on both sides are different from a magnetic field of the central magnetic pole 622. That is to say, when the magnetic field of the outer magnetic pole 622 is an N pole, the magnetic field of the central magnetic pole 622 is an S pole; and when the magnetic field of the outer magnetic pole 622 is an S pole, the magnetic field of the central magnetic pole 622 is changed to an N pole. The movable magnetic member 63 is a permanent magnet, with one end being an N pole and another end being an S pole and is disposed relative to the fixed magnetic member 62. In implementation, the fixed magnetic member 62 can also be a permanent magnet, and the movable magnetic member 63 can be composed of an electromagnet. The commutating member 64 and the movable magnetic member 63 of the electromagnetic unit are combined with each other, and the commutating member 64 is pivotally disposed in the enclosure portion 61 so that the commutating member 64 is capable of rotating relative to the enclosure portion 61 and the fixed magnetic member 62. A position of the movable magnetic member 63 can be changed with changes of magnetic field of the electromagnet of the fixed magnetic member 62, thereby driving the commutating member 64 to rotate and produce angular displacement changes. A positioning pin 641 is protruding from a side of the commutating member 64, the positioning pin 641 is slidably disposed in the arcuate positioning groove 611 of the enclosure portion 61, so that rotation angle of the commutating member 64 can be restricted. In addition, the electromagnetic unit can also be driven by a motor, and the commutating member 64 is a shaft 643 of the motor.

Please refer to FIG. 4 for the linkage member 70. In this embodiment, the linkage member 70 is composed of a connecting rod, which can also be composed of different components such as gear, crank, or slider. As long as the structure is capable of transmitting position changes, the component can be used as the linkage member 70. The linkage member 70 is provided with connecting portions 71 at both ends of the linkage member 70 respectively. The two connecting portions 71 are round holes respectively sleeved on the connecting rod 533 of the control member 53 and the positioning pin 641 of the commutating member 64; connecting method is not restricted, as long as the linkage member 70 can be connected to the control member 53 and the commutating member 64 respectively, and relative position changes can be generated, so that the linkage member 70 is capable of actuating the commutating member 64 and the control member 53. That is to say, when the commutating member 64 produces an angular displacement change due to the movable magnetic member 63, the control member 53 will also produce a corresponding angular displacement change. When the control member 53 rotates, positions of the pushing portion 531 and the guiding portion 532 will also produce angular displacement changes correspondingly, thereby capable of the pushing portion 531 contacting with the different swing arms 54 to control the different swing arms 54 to contact with the working head 51.

When the power tool 20 is operated, the power source 40 can be activated first, so that the drive motor 41 can drive the power gear set 42 to rotate and drive the eccentric shaft 421 to rotate deflectively. The eccentric shaft 421 is capable of swinging eccentrically in the receiving groove 521 of the swing member 52, so that the swing member 52 swings deflectively toward both ends with an axial point as a center. When the swing member 52 swings, the swing member 52 will drive the swing arm 54 contacting with the working head 51 to move the working head 51 continuously so that the working head 51 continues to rotate in a same direction and is capable of actuating in a same direction continuously.

FIGS. 6 to 9 show the state of switching rotation direction of the power tool 20 according to the invention. Please refer to FIGS. 6 and 7, magnetic fields of the three magnetic poles 622 of the fixed magnetic member 62 are respectively SNS, and magnetic fields N and S of the movable magnetic member 63 are attracted by the outer S and the central N respectively. At this time, the commutating member 64 will drive the linkage member 70 to pull downward, and the linkage member 70 will drive the control member 53 downward, so that the pushing portion 531 will move toward the linkage member 70, and the swing arm 54 away from the linkage member 70 is meshed with the working head 51.

Figure 9:
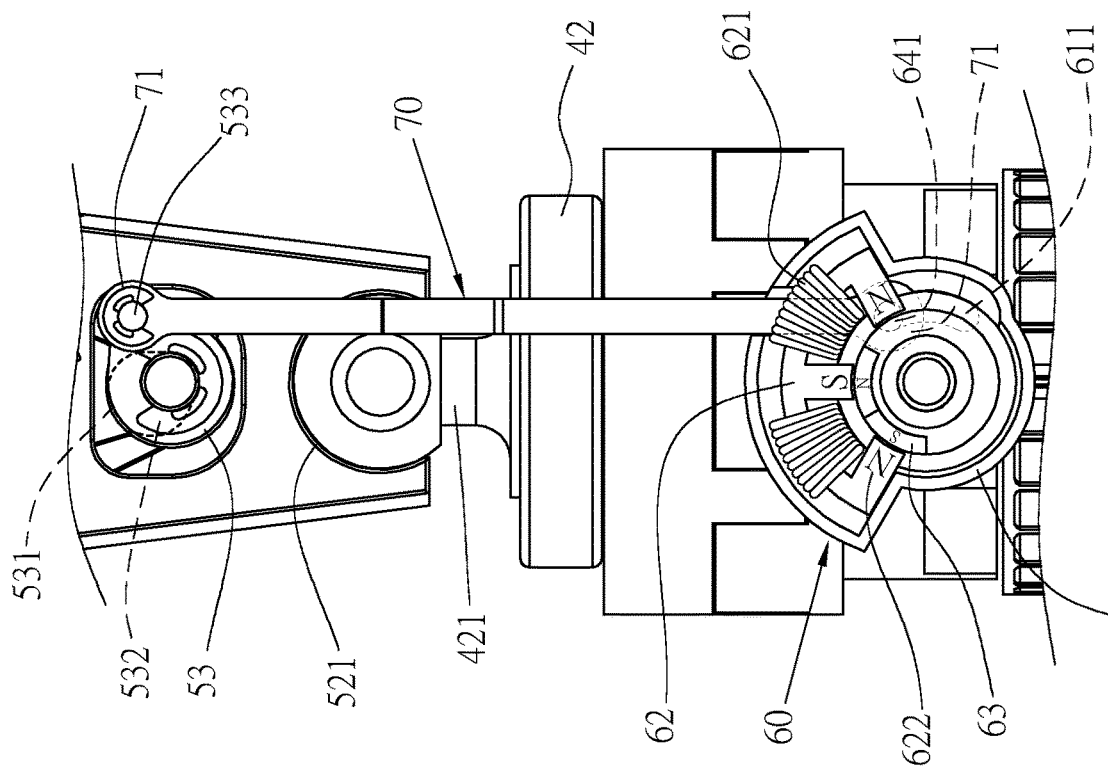
FIG. 9 is a partial enlarged view of FIG. 8.
Figure 7:
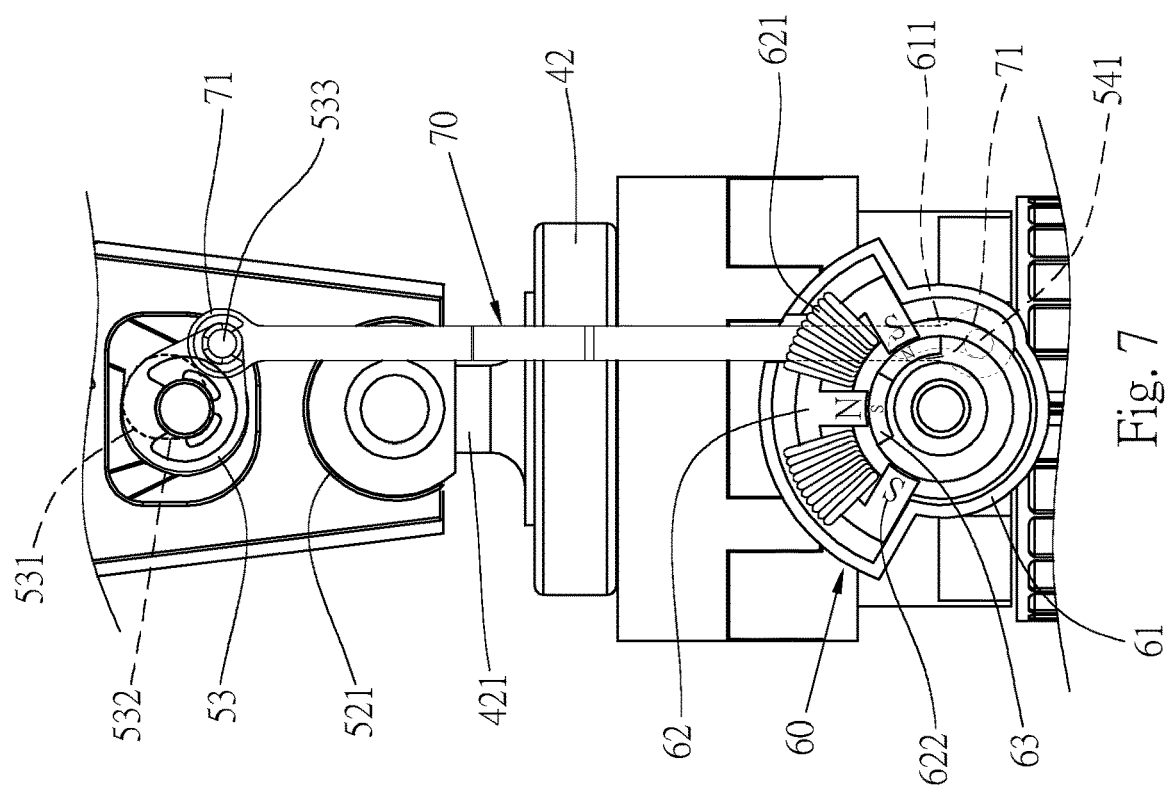
FIG. 7 is a partial enlarged view of FIG. 6.
Figure 8:
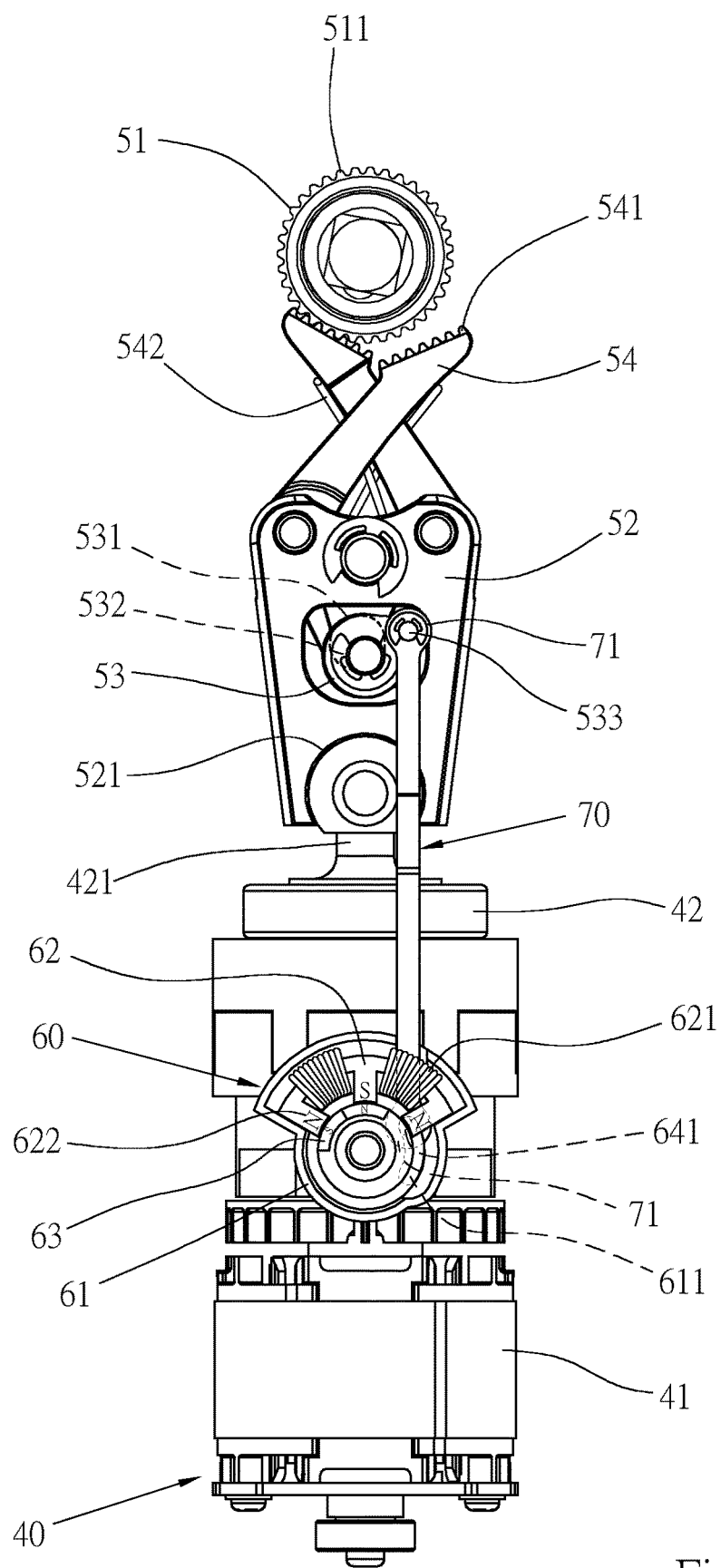
FIG. 8 is a schematic diagram of action in a second direction of the electrically controlled commutating assembly of the invention.

Please refer to FIGS. 8 and 9 for switching rotation action. Electric current directions of the coils 621 of the fixed magnetic member 62 are switched so that the magnetic fields of the three magnetic poles 622 of the fixed magnetic member 62 become NSN, the magnetic field N of the movable magnetic member 63 will be repelled by the N magnetic field of the magnetic poles 622 on the outer sides of the fixed magnetic member 62, and moves toward the central magnetic pole 622 converted into the S magnetic field. At this time, the commutating member 64 will produce an angular displacement to make the commutating member 64 to be capable of driving the linkage member 70 to displace upward, and upward displacement of the linkage member 70 will also cause the control member 53 to form an angular displacement. When the control member 53 is displaced, the pushing portion 531 will turn toward the swing arm 54 in another direction, the swing arm 54 abutted by the pushing portion 531 will be relatively away from the working head 51; while the swing arm 54 originally abutted by the pushing portion 531 will be in contact with the guiding portion 532. At the same time, elastic force of the elastic member 542 will push the swing arm 54 toward the working head 51, so that the swing arm 54 can contact with the working head 51, and the working head 51 is driven by the other swing arm 54 to make the working head 51 capable of generating a rotating motion in an opposite direction.

To switch direction again, only need to change the electric current directions of the coils 621, so that the magnetic fields of the three magnetic poles 622 of the fixed magnetic member 62 are SNS respectively, and the magnetic fields N and S of the movable magnetic member 63 will be respectively attracted by the outer S magnetic fields and the central N magnetic field. At this time, the commutating member 64 will drive the linkage member 70 to pull downward, and the linkage member 70 will drive the control member 53 downward, causing the pushing portion 531 to move toward the linkage member 70, and the swing arm 54 away from the linkage member 70 is meshed with the working head 51. And, displacing direction of the positioning pin 641 of the commutating member 64 will be restricted by the arcuate positioning groove 611 of the enclosure portion 61, so that moving position of the commutating member 64 can be restricted, and moving position of the commutating member 64 can be ensured, moving position of the linkage member 70 is fixed, and angle of rotation of the control member 53 can also be ensured; as a result, commutating operation can be reliably performed, without exceeding beyond switching position or causing misoperation.

Figure 10:
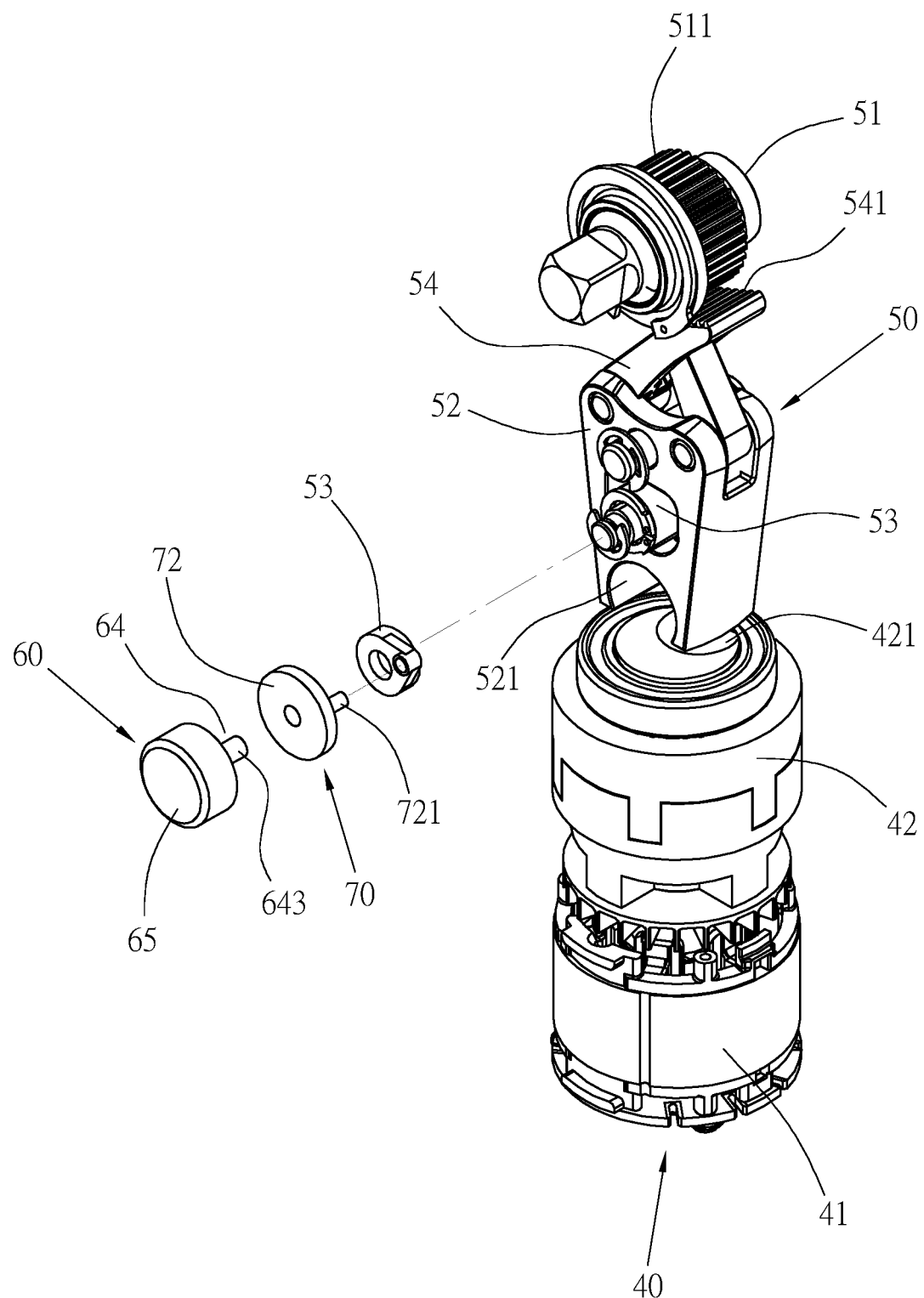
FIG. 10 is a perspective exploded view of an electromagnetic unit and a control member according to a second preferred embodiment of the invention.
Figure 11:
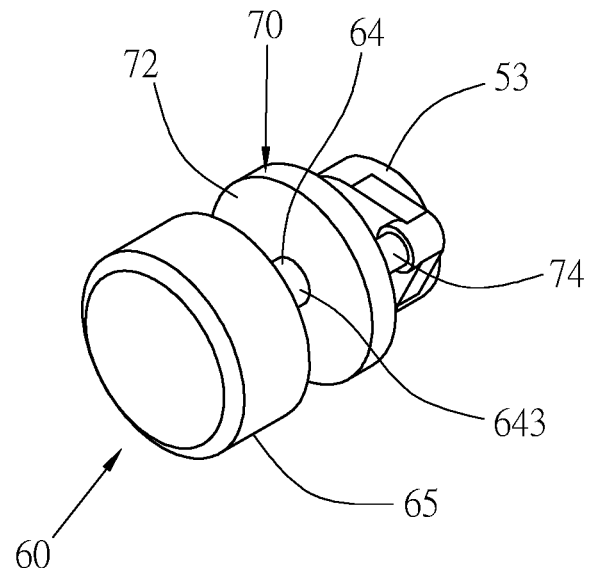
FIG. 11 is a schematic diagram of action in a first direction of the electrically controlled commutating assembly of the invention.
Figure 12:
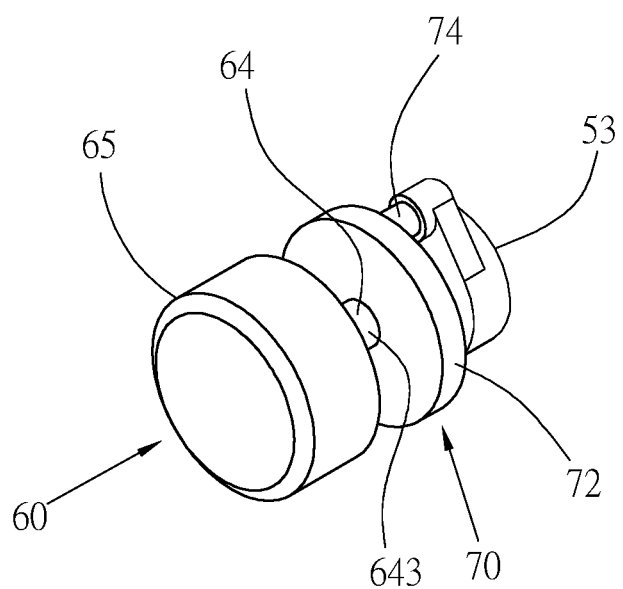
FIG. 12 is a schematic diagram of action in a second direction of the electrically controlled commutating assembly of the invention.

Please refer to FIGS. 10 to 12, which are a second preferred embodiment of the invention with main structure the same as that of the previous embodiment, and the same parts are given the same reference numerals which will not be repeated, wherein:

the electromagnetic unit of the electrically controlled commutating assembly 60 is composed of a motor 65 in this embodiment, such as a stepping motor, the electromagnetic unit can also use the structure of the first preferred embodiment without limitation, the motor 65 is provided with the commutating member 64, that is, the shaft 643 of the motor 65, the shaft 643 is fixedly connected with the linkage member 70, the linkage member 70 is a turntable 72, an eccentric rod 721 is provided on the turntable 72, and the eccentric rod 721 is eccentrically connected to the control member 53; the motor 65 will drive the shaft 643 of the commutating member 64 to rotate a predetermined angle, so that the turntable 72 of the linkage member 70 will also rotate, and at the same time, the eccentric rod 721 on the turntable 72 also produces an angular displacement, when the eccentric rod 721 rotates, the eccentric rod 721 will correspondingly drive the control member 53 to produce an angular displacement, so that the control member 53 is capable of producing a commutating effect.

Figure 14:
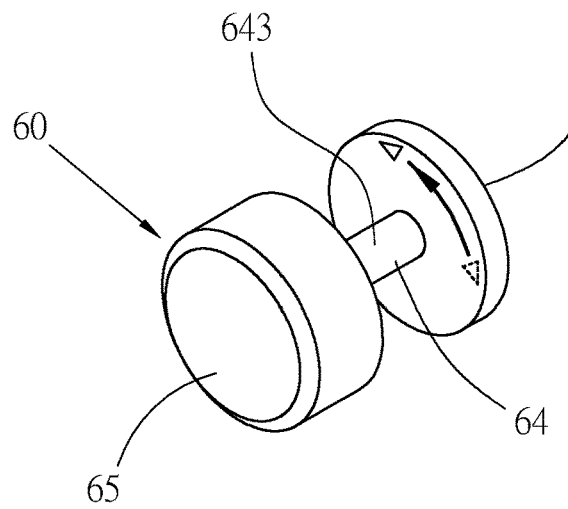
FIG. 14 is an assembled diagram of the electromagnetic unit and the control member according to the third preferred embodiment of the invention.
Figure 13:
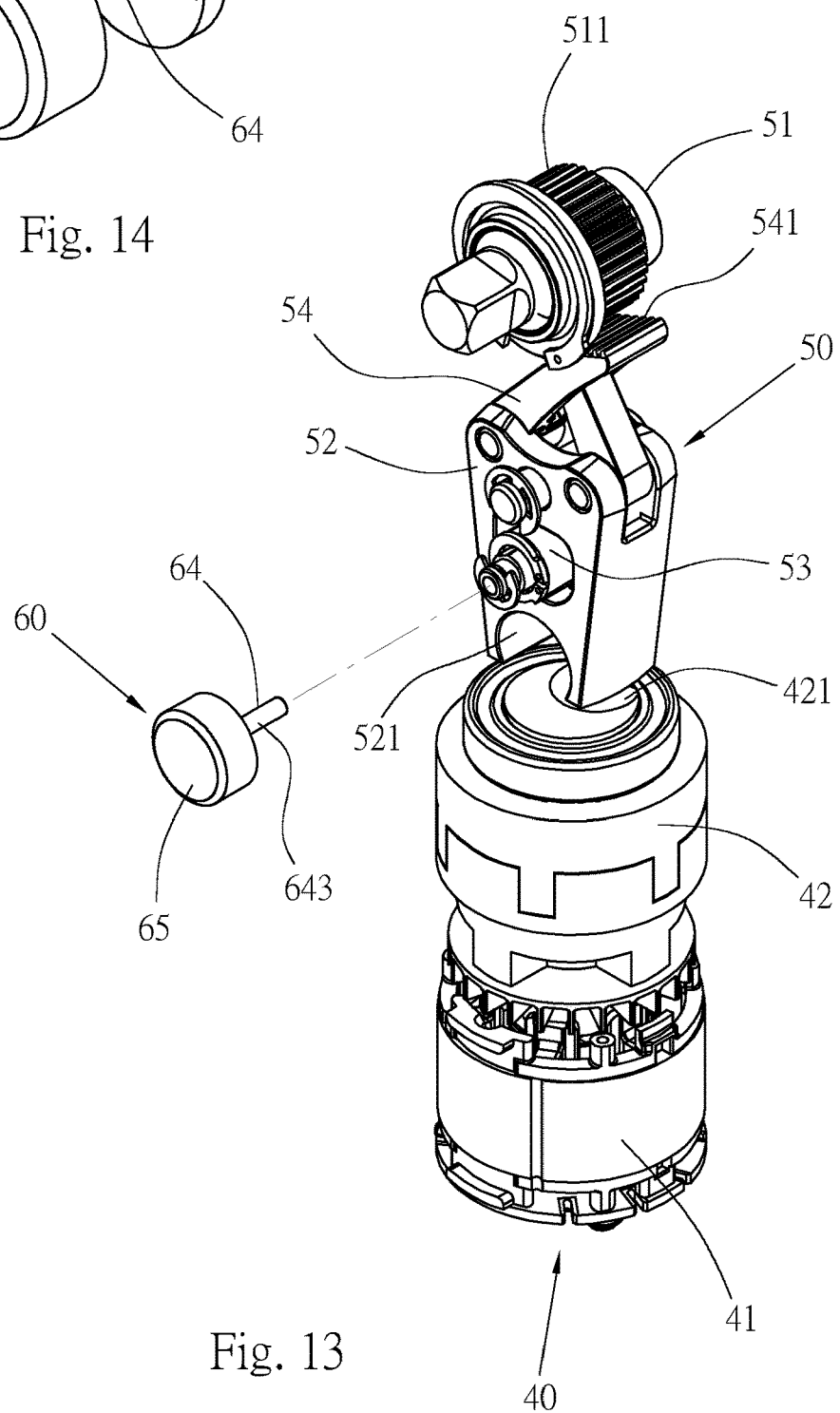
FIG. 13 is a perspective exploded view of the electromagnetic unit and the control member according to a third preferred embodiment of the invention.

Please refer to FIGS. 13 and 14, which are a third preferred embodiment provided by the invention with main structure the same as that of the second preferred embodiment, and the same parts are indicated by the same reference numerals which will not be repeated, wherein:

the shaft 643 of the commutating member 64 driven by the motor 65 of the electromagnetic unit of the electrically controlled commutating assembly 60 is directly connected to an axial position of the control member 53, when the motor 65 drives the shaft 643 to rotate, the shaft 643 rotates the control member 53 to cause the control member 53 to produce a commutating of rotation, if the electromagnetic unit of the first preferred embodiment is used, the commutating member 64 disposed at a center of axis of rotation of the movable magnetic member 63 can be directly connected to the control member 53, and through change of position of the movable magnetic member 63 the commutating member 64 rotates, thereby driving the control member 53.

Figure 17:
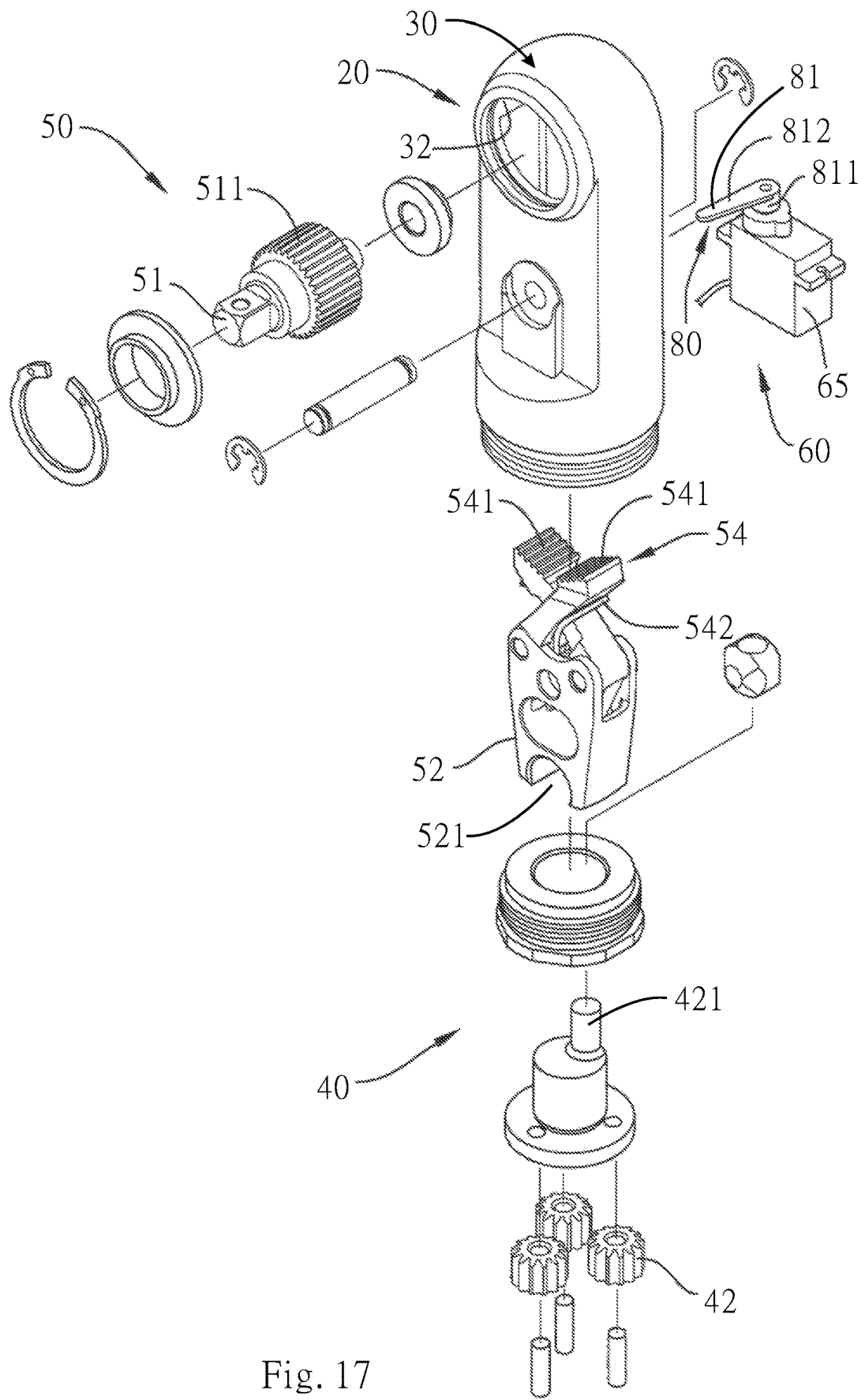
FIG. 17 is a perspective exploded view of the fourth preferred embodiment of the invention.
Figure 18:
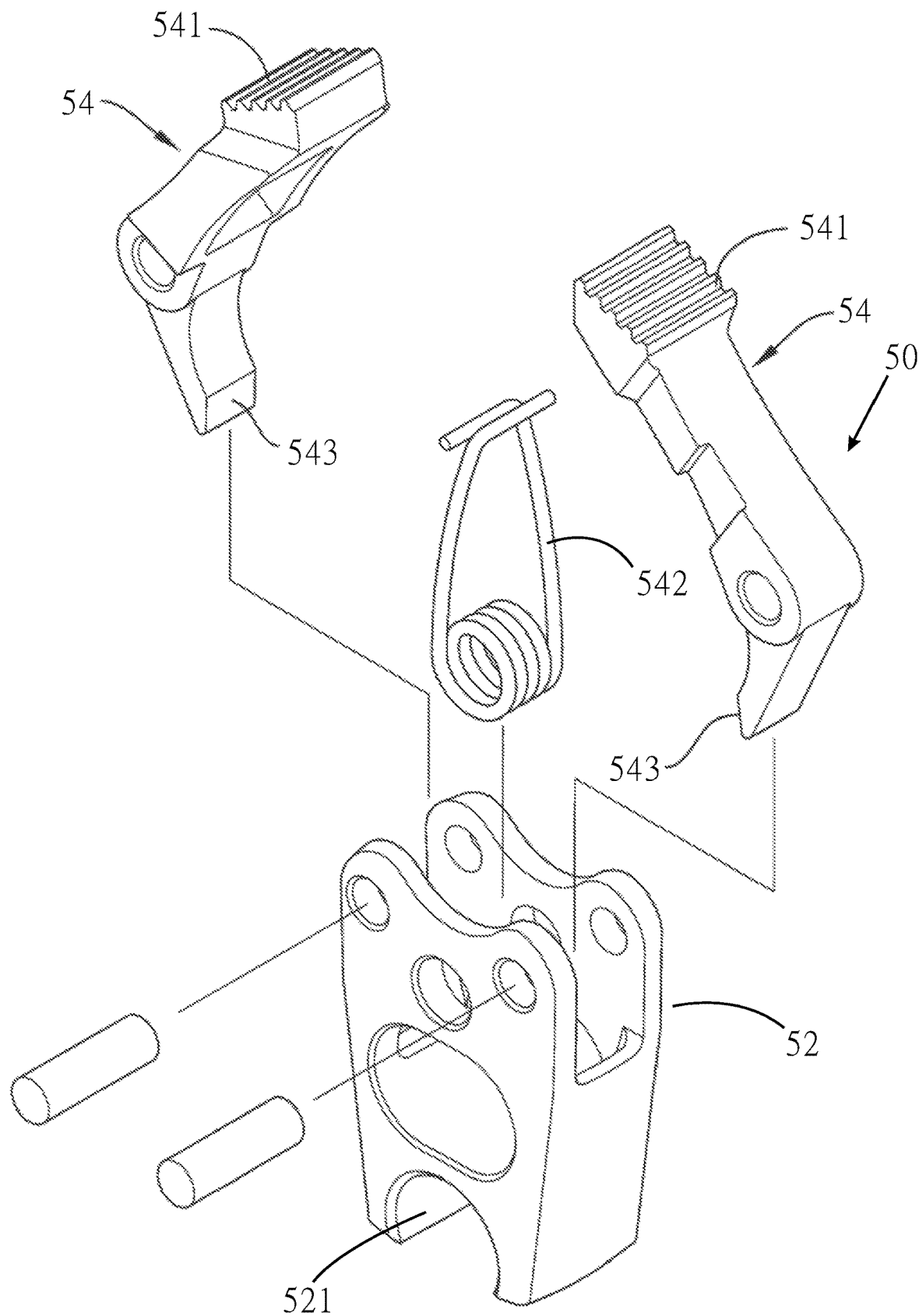
FIG. 18 is a perspective exploded view of a swing member and a swing arm of the fourth preferred embodiment of the invention.
Figure 19:
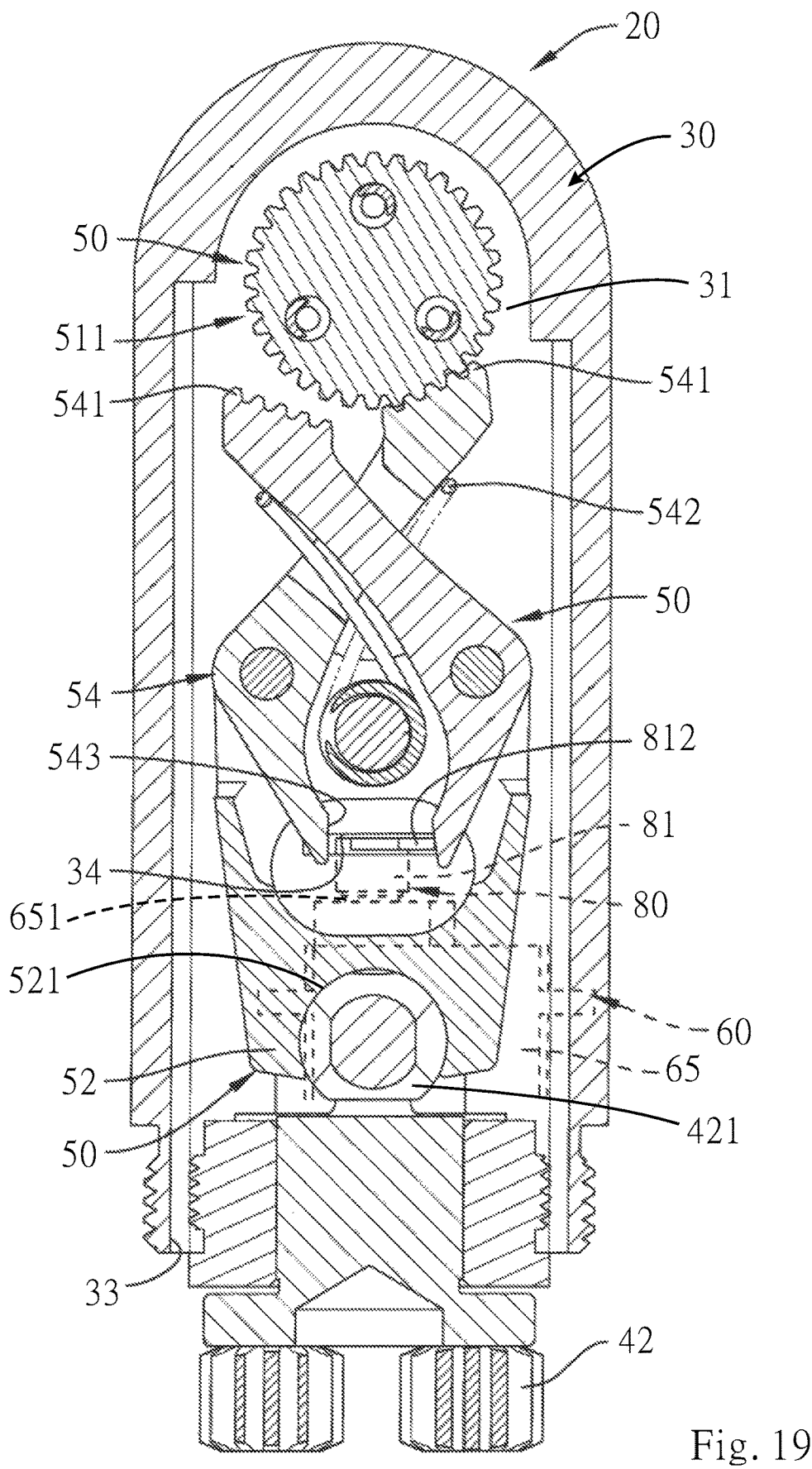
FIG. 19 is a cross-sectional view of a first state of use of the fourth preferred embodiment of the invention.

As shown in FIGS. 15 to 20, the main structure of a fourth preferred embodiment of the invention is the same as that of the first preferred embodiment, and the same parts are indicated by the same reference numerals which will not be repeated, wherein:

as shown in FIGS. 17 to 19, the ratchet 511 and the working head 51 are coaxially disposed, wherein the ratchet 511 is used to drive the working head 51 to rotate, the two swing arms 54 of the two driving members of the control unit are installed inside the accommodating space 31 of the housing 30 from the opening 33, the two swing arms 54 are capable of moving reciprocatively in the accommodating space 31 toward the ratchet 51, the two swing arms 54 are disposed in a crossed manner, the teeth portion 541 and the abutting part 543 are respectively located at two ends of the swing arm 54, and the teeth portion 541 of one of the swing arms 54 is capable of meshing with the ratchet 511.

Figure 20:
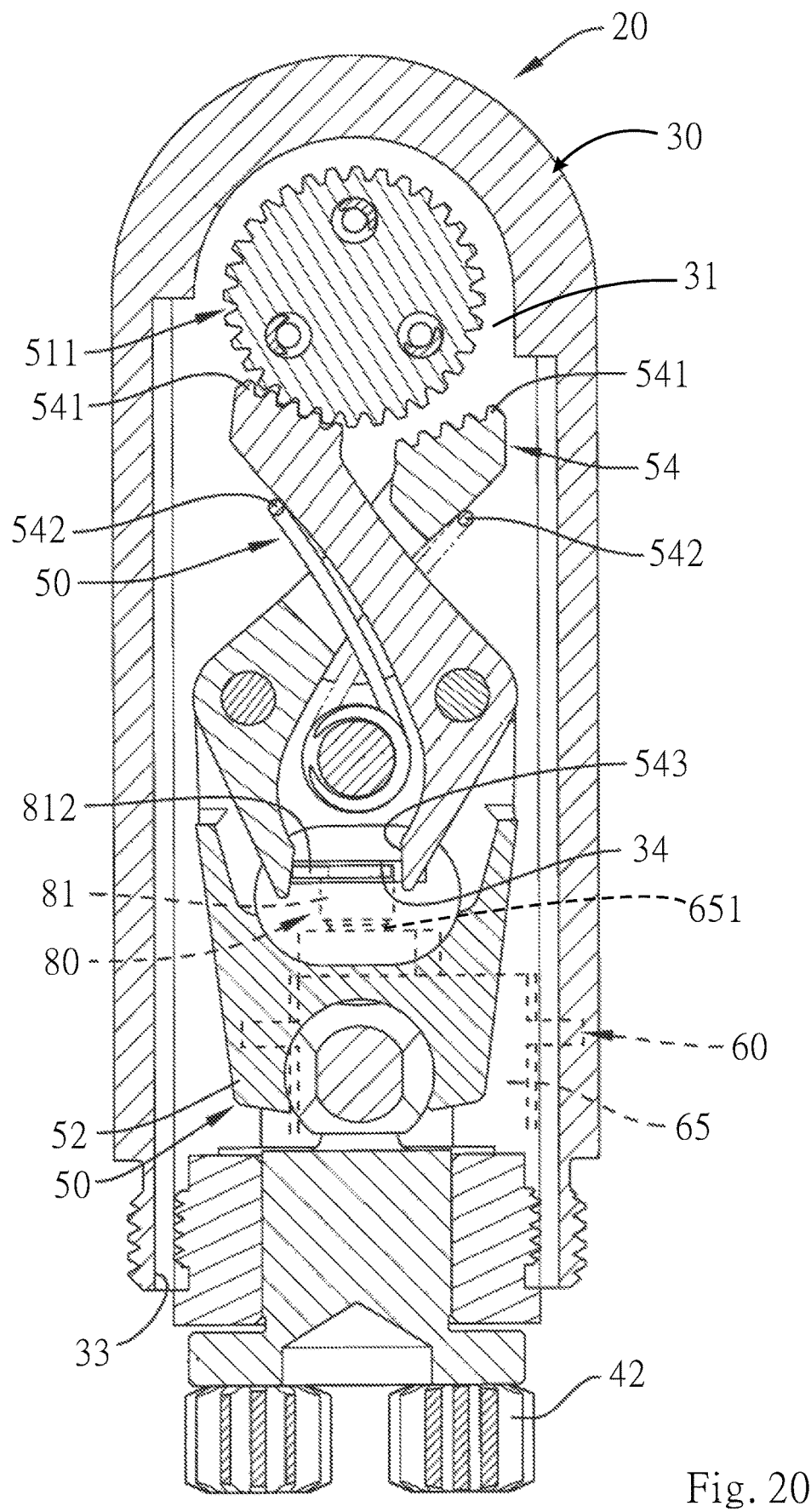
FIG. 20 is a cross-sectional view of a second state of use of the fourth preferred embodiment of the invention.

As shown in FIGS. 16, 19 and 20, the electrically controlled commutating assembly 60 is installed on an outer side of the power tool 20, and the electrically controlled commutating assembly 60 includes the electromagnetic unit and a control member 80. The control member 80 is an elongated stopper 81, the electromagnetic unit is located outside the housing 30, the electromagnetic unit is the motor 65, which can be a DC motor, a stepping motor or a servo motor, and in this preferred embodiment, the motor 65 is a servo motor. The stopper 81 can be driven to swing by the electromagnetic unit. The stopper 81 includes a coupling portion 811 and a stop portion 812. The coupling portion 811 can be fixedly connected to the motor 65 of the electromagnetic unit, so that the motor 65 can drive the stopper 81 to swing, the stop portion 812 penetrates into the accommodating space 31 of the housing 30 through the perforation 34, and the stop portion 812 can change position to push the abutting part 543 of one of the swing arms 54 to cause the teeth portion 541 of the swing arm 54 to be away from the ratchet 511.

As shown in FIGS. 17 to 19, the elastic member 542 is disposed between the two swing arms 54 so that the teeth portions 541 of the two swing arms 54 approach the ratchet 511, and the power source 40 can drive the swing member 52, so that the two swing arms 54 can move reciprocatively to drive the ratchet 511 to rotate.

As shown in FIG. 16, FIG. 19 and FIG. 20, the electrically controlled commutating assembly 60 is provided with the motor 65 of the electromagnetic unit, driven by the motor 65 to drive the stopper 81 of the control member 80 to swing, and the stop portion 812 of the stopper 81 is inserted into the housing 30 through the perforation 34; therefore, when the motor 65 of the electromagnetic unit drives the stopper 81 to swing on the outer side of the housing 30, the stop portion 812 will push the abutting part 543 of one of the swing arms 54 in the accommodating space 31, so that the teeth portion 541 of the swing arm 54 is away from the ratchet 511, and when the power source 40 drives the swing member 52, the other swing arm 54 can be driven to drive the ratchet 511 to rotate in a rotation direction. On the contrary, when the stop portion 812 moves in another direction to push the abutting part 543 of the other swing arm 54, the teeth portion 541 of the other swing arm 54 is also relatively away from the ratchet 511, and the other swing arm 54 that is not pushed by the stop portion 812 drives the ratchet 511 to cause the working head 51 rotate in another direction of rotation.

Figure 21:
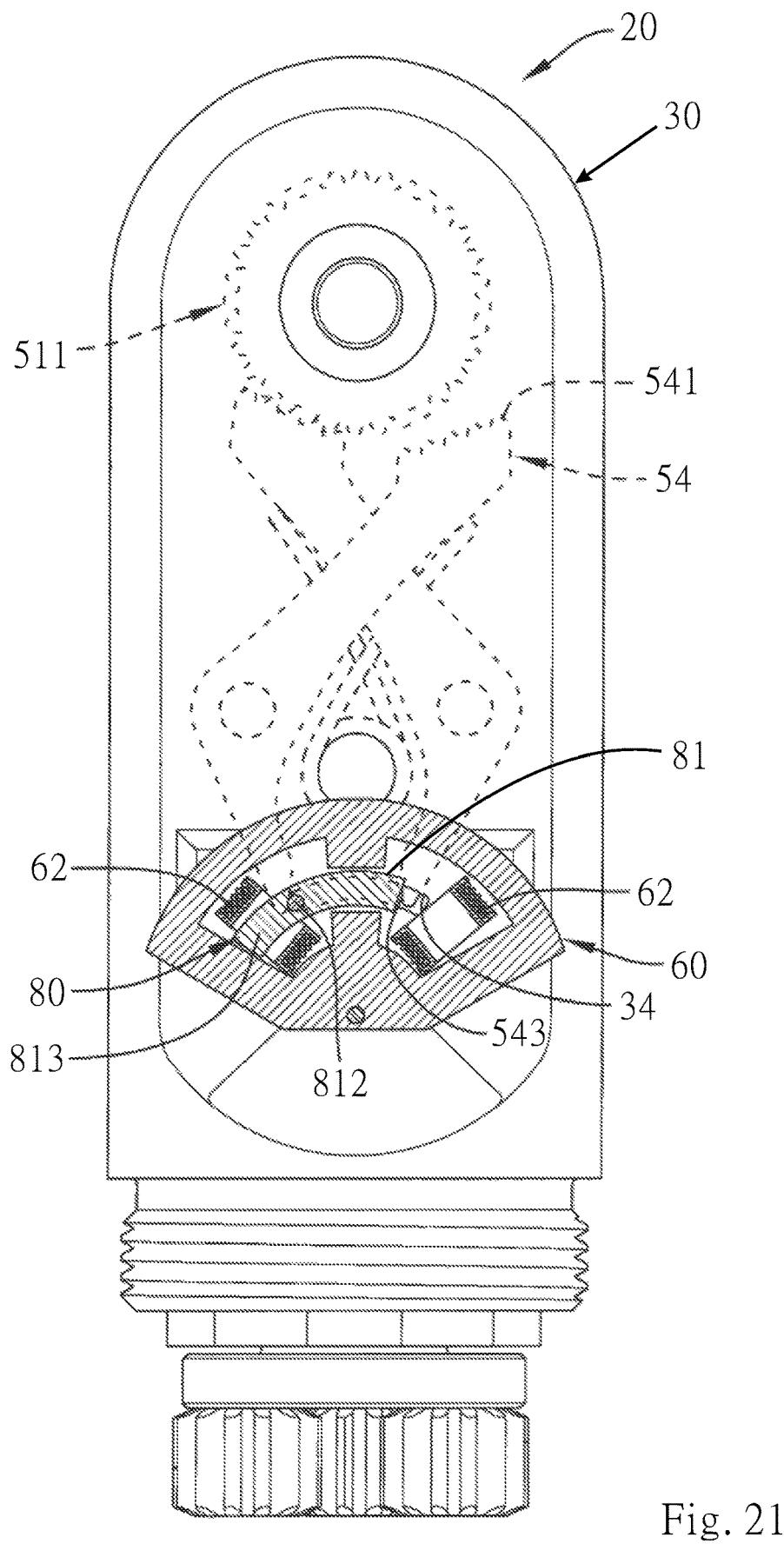
FIG. 21 is a schematic diagram of state of use of a fifth preferred embodiment of the invention.

As shown in FIG. 21, which is a fifth preferred embodiment of the invention with main structure roughly the same as that of the fourth preferred embodiment, and the same parts are indicated by the same reference numerals which will not be repeated, wherein: the differences merely lie in the form of the electrically controlled commutating assembly 60, so the following only describes the electrically controlled commutating assembly 60.

As shown in FIG. 21, the electromagnetic unit is located outside the housing 30. The electromagnetic unit is fan-shaped and includes the two fixed magnetic members 62 that can be energized. The two fixed magnetic members 62 are respectively disposed at two ends of the electromagnetic unit. The two fixed magnetic members 62 can conduct electricity to generate magnetism. The stopper 81 of the control member 80 includes a magnetic attraction portion 813 and the stop portion 812. The magnetic attraction portion 813 is made of metal and is disposed between the two fixed magnetic members 62, the magnetic attraction portion 813 can be attracted by electromagnetism generated by one of the fixed magnetic members 62, and a displacement change can be formed between the two fixed magnetic members 62, so that the electromagnetic unit drives the stopper 81 of the control member 80 to swing. The stop portion 812 is inserted into the housing 30 through the perforation 34, and the stop portion 812 is capable of pushing the abutting part 543 of one of the swing arms 54 to cause the teeth portion 541 of the swing arm 54 to be away from the ratchet 511.

As shown in FIG. 21, when the electrically controlled commutating assembly 60 uses the electromagnetic unit to drive the stopper 81 of the control member 80 to swing, and since the magnetic attraction portion 813 is disposed between the two fixed magnetic members 62, the magnetic attraction portion 813 will be attracted to draw near by one of the fixed magnetic members 62 of conductive flux, so that the stopper 81 is capable of swinging and displacing between two ends of the electromagnetic unit, and the stop portion 812 will push the abutting part 543 of one of the swing arms 54 to cause the teeth portion 541 of the swing arm 54 to be away from the ratchet 511, so that the other swing arm 54 can relatively drive the ratchet 511 to rotate in a rotation direction.

Figure 22:
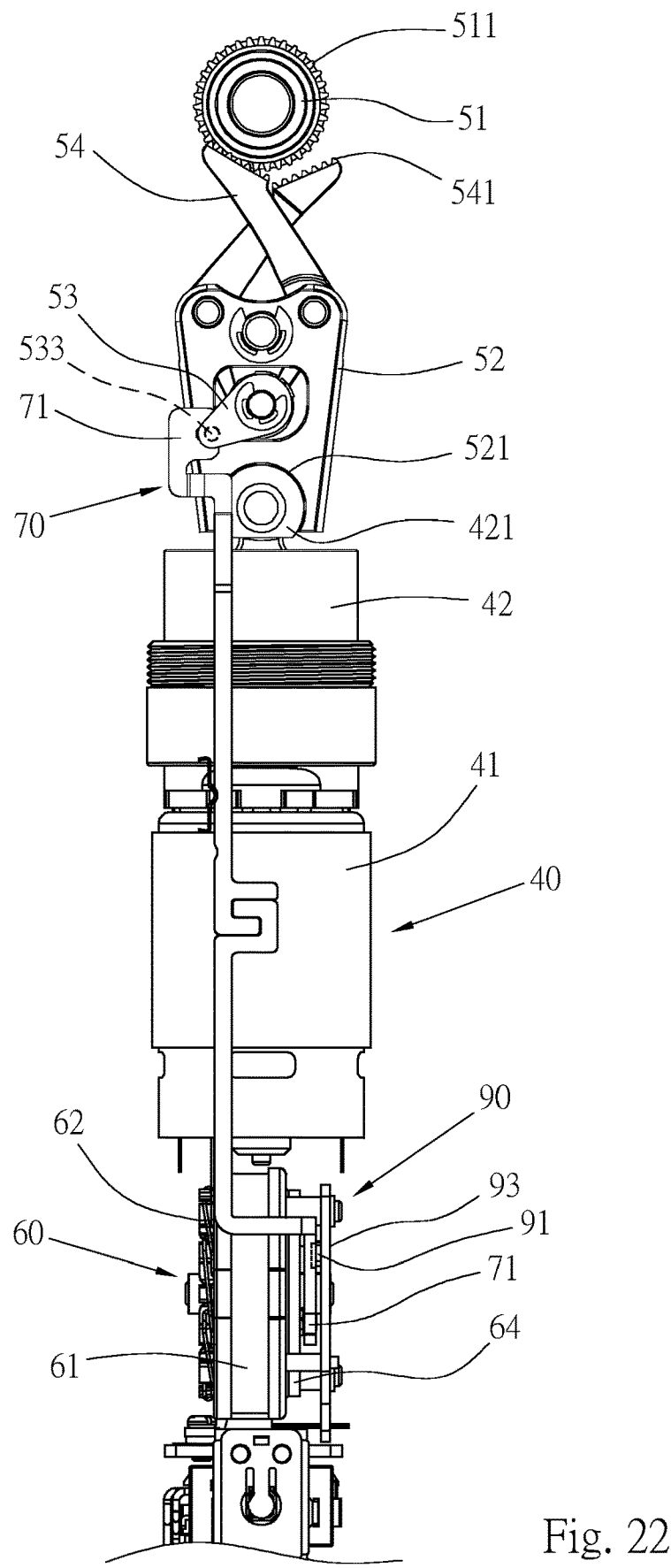
FIG. 22 is a front view of a sixth preferred embodiment of the invention.

As shown in FIGS. 22 to 24, which are a sixth preferred embodiment of the invention with main structure similar to that of the first preferred embodiment, and the same parts are given the same reference numerals, wherein:

please refer to FIGS. 22 and 23, the electrically controlled commutating assembly 60 is disposed below the drive motor 41 of the power source 40, which can further reduce a circumferential thickness of the power tool 20, the fixed magnetic member 62 is surrounded by the coils 621 into a ring shape, and the magnetic pole 622 is disposed between the two adjacent coils 621, the commutating member 64 is disposed inside a middle of the fixed magnetic member 62, the commutating member 64 is circumferentially disposed with the movable magnetic members 63, with the movable magnetic members 63 and the fixed magnetic member 62 disposing in a ring shape, magnetic force subjected by the movable magnetic members 63 on the commutating member 64 can be evenly distributed; and a position sensing unit 90 includes a sensing portion 91, a triggering portion 92, and a circuit board 93, the sensing portion 91 is composed of two Hall sensors 911, the triggering portion 92 is a magnet 921, the sensing portion 91 is disposed on the circuit board 93 and disposed on an outer side of the commutating member 64, the circuit board 93 is fixedly disposed in the power tool 20, so that a position of the sensing portion 91 is fixed, the triggering portion 92 is disposed on the commutating member 64, when a position of the commutating member 64 changes, the triggering portion 92 will also change in position, and positions of the two Hall sensors 911 are disposed at two ends of displaceable positions of the triggering portion 92, that is, relative to the position of the control member 53; when one of the Hall sensors 911 senses the triggering portion 92, it means that the control member 53 has reached a set commutating position; and when the other Hall sensor 911 senses the triggering portion 92, it relatively indicates that the control member 53 has reached another set commutating position, the Hall sensors 911 can not only sense a position of the triggering portion 92 to determine a direction of movement of the working head 51; signals generated by the Hall sensors 911 can also be used to trigger display of position switching light, the light display allows a user to know the current direction of rotation; when the power tool 20 is turned on and used, direction of rotation can also be known directly without the need to reset the direction of rotation of the power tool 20; after receiving the signals, the Hall sensors 911 can stop the action of the electromagnetic unit to prevent the electromagnetic unit continuously conducting magnetism and consuming power; the position sensing unit 90 can be disposed at any position with changes in position during the commutating process, that is, on any components such as the linkage member 70, the control member 53, etc., that change position when a rotation direction of the working head 51 changes.

In addition, because a distance between the electrically controlled commutating assembly 60 and the control unit is relatively long, in order to maintain a precision of the linkage member 70, the linkage member 70 can be combined in a multi-sectional connection. In this embodiment, two sections are connected to form the linkage member 70, and two ends thereof are respectively connected to the commutating member 64 of the electrically controlled commutating assembly 60 and the control member 53 of the control unit.

Figure 27:
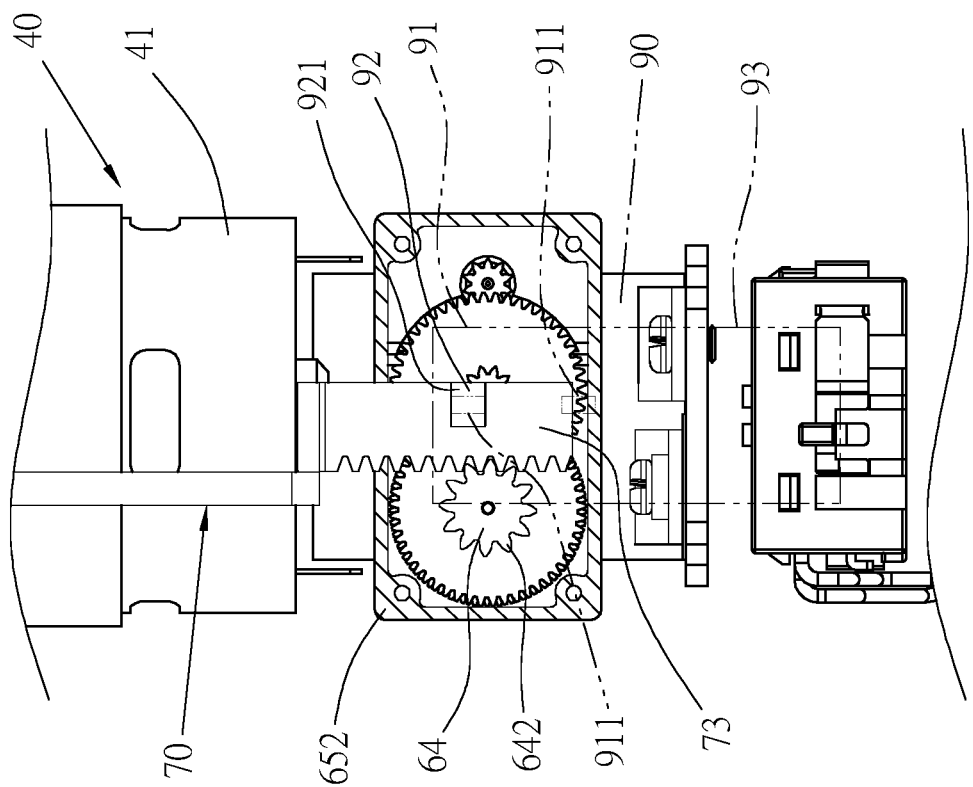
FIG. 27 is a schematic diagram of a second action of the electrically controlled commutating assembly of the seventh preferred embodiment of the invention.
Figure 25:
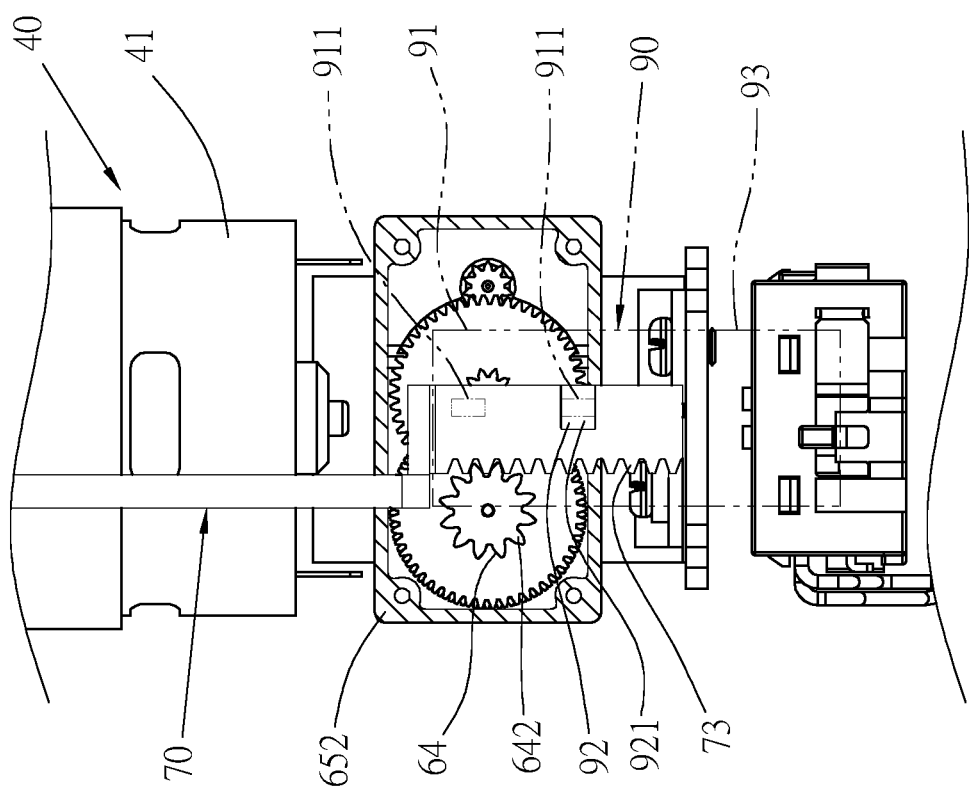
FIG. 25 is a schematic diagram of a first action of the electrically controlled commutating assembly of a seventh preferred embodiment of the invention.
Figure 26:
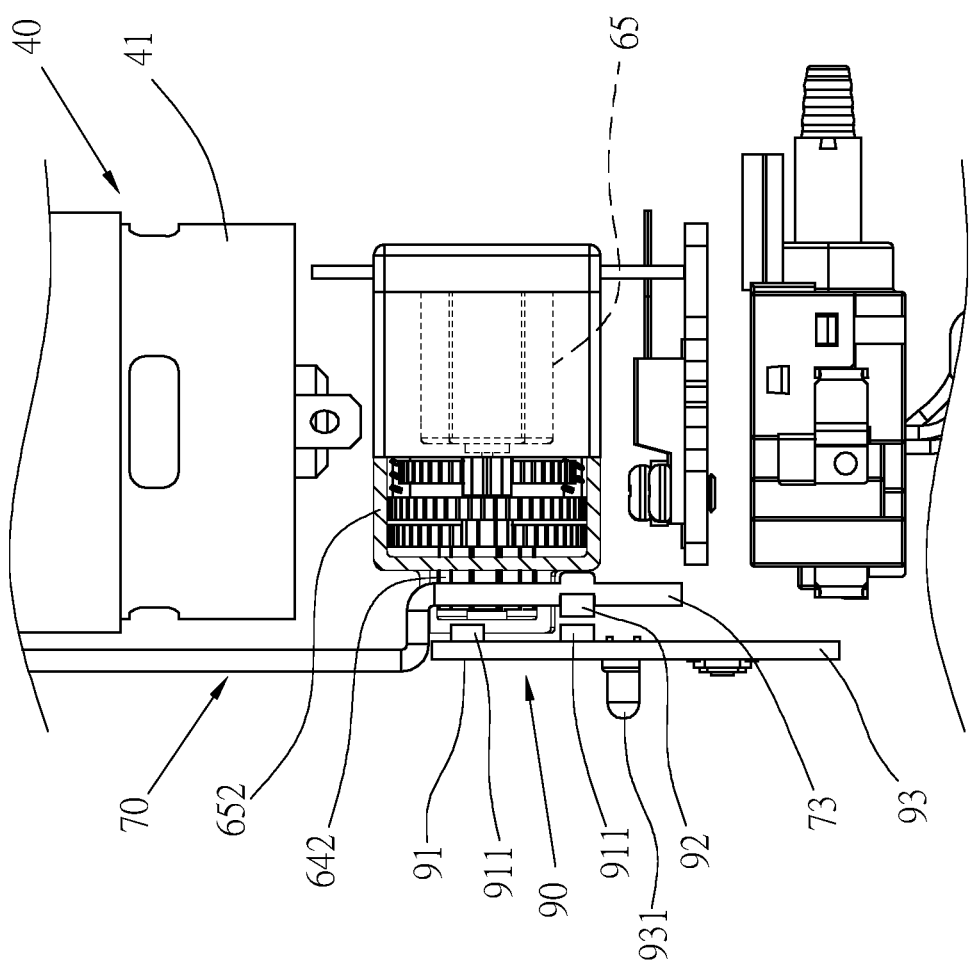
FIG. 26 is a side view of the seventh preferred embodiment of the invention.

Please refer to FIGS. 25 to 27, which are a seventh preferred embodiment provided by the invention with main structure similar to that of the sixth embodiment, and the same parts are indicated by the same reference numerals which will not be repeated, wherein:

please refer to FIGS. 25 and 26, the electrically controlled commutating assembly 60 is the motor 65, a front end of the motor 65 is connected with a gear set 652 being a reduction gear set, a front end of the gear set 652 is provided with the commutating member 64 being a gear 642, a bottom of the linkage member 70 is provided with a rack 73 to be meshed with the gear 642 of the commutating member 64, through rotation of the gear 642 can drive the rack 73 to change position so that the rack 73 can be raised or lowered, and the linkage member 70 can be correspondingly raised or lowered, a position of the control member 53 can be switched by lifting and lowering of the linkage member 70; please refer to FIGS. 25 and 27, the circuit board 93 of the position sensing unit 90 is also disposed at a fixed position on an outer side of the rack 73, and the triggering portion 92 is provided on the rack 73, change in position of the rack 73 will cause the triggering portion 92 to move synchronously, so that the sensing portion 91 can determine a position of the control member 53 by detecting a position of the triggering portion 92, the circuit board 93 is provided with a display light set 931, the display light set 931 can change display light signal according to the sensing portion 91 triggered by the triggering portion 92, so that the user can view and confirm a rotation direction of the working head 51.

The above merely describes the preferred embodiments of the invention. The invention does not limit the arrangement of the two swing arms and a quantity of the ratchet. The two swing arms of the invention can also be disposed side by side in a non-crossing arrangement as shown in Taiwan Patent numbers M447817, I222916 and I370043, the teeth portion of each of the swing arms is located at one end of the swing arm adjacent to the ratchet, and another end of the swing arm is pivotally disposed on the swing member, two ends of the elastic member are respectively disposed on the two swing arms so that the two swing arms approach the ratchet. The ratchet of the invention can also be as shown in Taiwan Patent No. M447817 with the two ratchets, the two ratchets are divided into a first ratchet and a second ratchet respectively. The working head is disposed coaxially with the first ratchet, the second ratchet meshes with the first ratchet, wherein the teeth portion of one of the swing arms can mesh with the second ratchet to make the second ratchet drive the first ratchet to rotate. As long as the power source can be connected to the two swing arms to drive the ratchet to rotate, and the ratchet can drive the driving device to rotate, such features belong to the scope of patent of the invention.

The power tool of the invention can perform commutating action by changing the magnetic field of the electrically controlled commutating assembly. Compared with the conventional manual commutating structure, commutating action performed with the invention does not require removing the power tool first, and the commutating action is quite clear, which can ensure that the action can be reliably performed.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A power tool with an electrically controlled commutating assembly comprising:
   a driving device including a working head and a control unit, the control unit having a control member, the control member being capable of changing position to control the working head to rotate in different directions; and
   the electrically controlled commutating assembly having an electromagnetic unit; the electromagnetic unit changing position due to electromagnetic effect; and the electromagnetic unit being connected with the control member of the control unit to be capable of actuating the control member to change position;
   wherein the working head of the driving device is connected with at least one ratchet, and the at least one ratchet is capable of driving the working head to rotate;
   wherein the control unit further includes at least one driving member and a swing member, each of the at least one driving member is at least one swing arm, each of the at least one driving member is pivotally disposed on the swing member so that each of the at least one driving member is capable of moving reciprocatively toward the ratchet, each of the at least one swing arm includes a teeth portion, and the teeth portion of each of the at least one swing arm is capable of meshing with the said ratchet; and
   wherein the electrically controlled commutating assembly is used to control the control member so that the teeth portion of one of the at least one swing arm is away from said ratchet.

2. The power tool as claimed in claim 1, wherein the swing arm includes an abutting part, the control member of the control unit is a stopper, the stopper is capable of being driven by the electromagnetic unit to swing, the stopper includes a stop portion, and the stop portion pushes the abutting part of one of the swing arms to make the teeth portion of the swing arm away from the said ratchet.

3. The power tool as claimed in claim 2, wherein the electromagnetic unit is a motor, the stopper of the control member includes a coupling portion, and the coupling portion is capable of fixedly connecting with the motor so that the motor is capable of driving the stopper to swing.

4. The power tool as claimed in claim 2, wherein the electromagnetic unit includes two fixed magnetic members, the two fixed magnetic members are respectively disposed at two ends of the electromagnetic unit; the stopper of the control member includes a magnetic attraction portion, the magnetic attraction portion is disposed between the two fixed magnetic members, and the magnetic attraction portion of the stopper is capable of being attracted by one of the fixed magnetic members and approaching, so that the two fixed magnetic members are capable of magnetically driving the stopper respectively to cause the stopper to change in position.

5. The power tool as claimed in claim 1, wherein the control member has a pushing portion and two guiding portions, the two guiding portions are disposed on two sides of the pushing portion respectively; the at least one driving member is two swing arms, and one end of each of the two swing arms is in contact with the control member.

6. The power tool as claimed in claim 5, wherein the electrically controlled commutating assembly has a commutating member; the electromagnetic unit changes position due to electromagnetic effect to be capable of driving the commutating member to displace; a linkage member with one end disposed on the control member of the control unit, and another end thereof connected with the commutating member; displacement change of the commutating member drives the linkage member, and the linkage member actuates the control member to change in position.

7. The power tool as claimed in claim 6, wherein the electromagnetic unit of the electrically controlled commutating assembly includes a fixed magnetic member and a movable magnetic member; a position of the fixed magnetic member is fixed, magnetic field positions of the fixed magnetic member and the movable magnetic member are relatively set; the commutating member is connected with the movable magnetic member, and the commutating member and the movable magnetic member are capable of moving relative to the fixed magnetic member, so that the commutating member produces a displacement change.

8. The power tool as claimed in claim 7, wherein the fixed magnetic member and the movable magnetic member are an electromagnet and a permanent magnet, respectively.

9. The power tool as claimed in claim 7, wherein further including an enclosure portion, the electromagnetic unit and the commutating member of the electrically controlled commutating assembly being disposed in the enclosure portion; the fixed magnetic member being fixedly disposed in the enclosure portion, and the commutating member being pivotally disposed in the enclosure portion.

10. The power tool as claimed in claim 9, wherein the commutating member has a positioning pin; the enclosure portion is provided with an arcuate positioning groove; the positioning pin is capable of displacing in the positioning groove; and one end of the linkage member is disposed on the positioning pin.

11. The power tool as claimed in claim 6, wherein the control member has a connecting rod, and one end of the linkage member is disposed on the connecting rod.

12. The power tool as claimed in claim 6, wherein the electromagnetic unit is a motor, the commutating member is a shaft; the motor is capable of driving the shaft to rotate, and the shaft is capable of driving the linkage member to displace.

13. The power tool as claimed in claim 6, wherein the linkage member is a turntable, the turntable is fixedly disposed on the commutating member, the turntable is provided with an eccentric rod at a non-axial position; and the control member is eccentrically connected with the eccentric rod.

14. The power tool as claimed in claim 6, wherein the electromagnetic unit of the electrically controlled commutating assembly is a motor, the commutating member is a gear, and the linkage member is provided with a rack meshing with the gear of the commutating member.

15. The power tool as claimed in claim 14, wherein a gear set is connected between the motor and the gear.

16. The power tool as claimed in claim 6, wherein further including a power source connected to the swing member of the control unit; the power source being disposed below the driving device, and the electrically controlled commutating assembly being disposed below the power source.

17. The power tool as claimed in claim 5, wherein the control member of the control unit is capable of producing a change in rotation position to control the working head to rotate in different directions; the electromagnetic unit is provided with a rotatable commutating member connected with the control member, and the electromagnetic unit is capable of rotating to actuate the control member to generate a position change in rotation direction.

18. The power tool as claimed in claim 17, wherein the electromagnetic unit of the electrically controlled commutating assembly is a motor, the commutating member is a shaft, the shaft is capable of rotating by change of magnetic field, and the shaft is connected with the control member.

19. The power tool as claimed in claim 18, wherein the shaft of the commutating member is connected to a center of the control member.

20. The power tool as claimed in claim 17, wherein the electromagnetic unit of the electrically controlled commutating assembly includes a fixed magnetic member and a movable magnetic member; a position of the fixed magnetic member is fixed, magnetic field positions of the fixed magnetic member and the movable magnetic member are relatively set; the movable magnetic member is capable of rotating relative to the fixed magnetic member, so that the movable magnetic member produces a rotational change, the commutating member is disposed at an axis of the movable magnetic member; and the commutating member is connected with the control member to rotate the control member.

21. The power tool as claimed in claim 20, wherein the fixed magnetic member and the movable magnetic member are a permanent magnet and an electromagnet, respectively.

22. The power tool as claimed in claim 1, wherein further including a position sensing unit, the position sensing unit being disposed between the electromagnetic unit of the electrically controlled commutating assembly and the control member of the control unit to be capable of sensing position change of the control member.

23. The power tool as claimed in claim 22, wherein the position sensing unit is disposed on or around the electrically controlled commutating assembly, and capable of sensing displacement change of the electromagnetic unit of the electrically controlled commutating assembly.

24. The power tool as claimed in claim 23, wherein the position sensing unit includes a sensing portion and a triggering portion, the triggering portion moves with position change of the electromagnetic unit, and the sensing portion is capable of sensing position of the triggering portion.

25. The power tool as claimed in claim 24, wherein the sensing portion is at least one Hall sensor, and the triggering portion is at least one magnet.

26. The power tool as claimed in claim 22, wherein the position sensing unit includes a sensing portion and a triggering portion, the triggering portion moves with position change of the electromagnetic unit, and the sensing portion is capable of sensing position of the triggering portion.

27. The power tool as claimed in claim 26, wherein the sensing portion is at least one Hall sensor, and the triggering portion is at least one magnet.

* * * * *